US 6,582,112 B2

(12) United States Patent
Kreutzer et al.

(10) Patent No.: US 6,582,112 B2
(45) Date of Patent: Jun. 24, 2003

(54) VEHICULAR WARNING LIGHT WITH TWO OR MORE DICHROIC ELEMENTS

(75) Inventors: Robert E. Kreutzer, Columbia, IL (US); Dennis A. Dohogne, St. Peters, MO (US); Paul L. Stein, St. Peters, MO (US)

(73) Assignee: Code 3, Inc., St. Lous, MO (US)

( * ) Notice: Subject to any disclaimer, the term of this patent is extended or adjusted under 35 U.S.C. 154(b) by 0 days.

(21) Appl. No.: 10/235,273

(22) Filed: Sep. 5, 2002

(65) Prior Publication Data

US 2003/0012032 A1 Jan. 16, 2003

Related U.S. Application Data

(62) Division of application No. 09/431,327, filed on Nov. 2, 1999, now Pat. No. 6,461,022.
(60) Provisional application No. 60/106,705, filed on Nov. 2, 1998.

(51) Int. Cl.[7] .................................................. B60Q 1/26
(52) U.S. Cl. ........................ 362/542; 362/293; 362/493; 340/468; 359/634; 116/48
(58) Field of Search ................................ 362/293, 493, 362/510, 540, 542; 340/463, 468, 470, 471, 472; 359/630, 634; 315/77; 116/46, 48, 49, 51, 54

(56) References Cited

U.S. PATENT DOCUMENTS

| 3,586,851 A | 6/1971 | Roudolph |
| 4,482,942 A | 11/1984 | Blaisdell et al. |
| 4,488,207 A | 12/1984 | Harmon |
| 4,602,321 A | 7/1986 | Bornhorst |
| 4,620,791 A | 11/1986 | Combastet |
| 4,800,474 A | 1/1989 | Bornhorst |
| 4,836,649 A | 6/1989 | Ledebuhr et al. |
| 4,839,553 A * | 6/1989 | Mellor ................... 313/111 |
| 4,897,770 A | 1/1990 | Solomon |
| 4,933,751 A | 6/1990 | Shinonaga et al. |
| 4,958,265 A | 9/1990 | Solomon |
| 4,974,136 A | 11/1990 | Noori-Shad et al. |
| 4,996,632 A | 2/1991 | Aikens |
| 5,014,167 A | 5/1991 | Roberts |
| 5,031,078 A | 7/1991 | Bornhorst |
| 5,060,126 A | 10/1991 | Tyler et al. |
| 5,071,225 A | 12/1991 | Inoue |
| 5,073,847 A | 12/1991 | Bornhorst |
| 5,096,280 A | 3/1992 | Hamada |
| 5,105,265 A | 4/1992 | Sato et al. |
| 5,177,396 A | 1/1993 | Gielen et al. |
| 5,186,536 A | 2/1993 | Bornhorst et al. |
| 5,207,492 A | 5/1993 | Roberts |
| 5,361,190 A | 11/1994 | Roberts et al. |
| 5,414,603 A | 5/1995 | Conway |
| 5,426,576 A | 6/1995 | Hewlett |
| 5,452,188 A | 9/1995 | Green et al. |
| 5,481,409 A | 1/1996 | Roberts |
| 5,597,231 A | 1/1997 | Rosset |
| 5,600,487 A | 2/1997 | Kiyomoto et al. |
| 5,648,870 A | 7/1997 | Mistutake |
| 5,681,104 A | 10/1997 | Chinniah et al. |
| 5,691,696 A | 11/1997 | Mazies et al. |

(List continued on next page.)

Primary Examiner—Sandra O'Shea
Assistant Examiner—John Anthony Ward
(74) Attorney, Agent, or Firm—Senniger, Powers, Leavitt & Roedel

(57) ABSTRACT

A visible light source adapted to be mounted on the vehicle for generating visible light to be used to create warning signals which are viewed by observers remote from the vehicle. A dichroic element adapted to be mounted on the vehicle and adjacent to the visible light source transmits at least some of the visible light generated by the light source and reflects at least some of the visible light generated by the light source. The transmitted and reflected light provides warning light signals within different wavelength ranges when viewed by an observer remote from the vehicle.

20 Claims, 21 Drawing Sheets

U.S. PATENT DOCUMENTS

| | | |
|---|---|---|
| 5,708,530 A | 1/1998 | Huang |
| 5,715,095 A | 2/1998 | Hiratsuka et al. |
| 5,752,215 A | 5/1998 | Zaaiman et al. |
| 5,788,357 A | 8/1998 | Muth et al. |
| 5,790,329 A | 8/1998 | Klaus et al. |
| 5,803,579 A | 9/1998 | Turnbull et al. |
| 5,825,548 A | 10/1998 | Bornhorst et al. |
| 5,842,765 A | 12/1998 | Cassarly et al. |
| 5,882,107 A | 3/1999 | Bornhorst et al. |
| 5,892,598 A | 4/1999 | Asakawa et al. |
| 5,930,048 A | 7/1999 | Kaneko |
| 5,969,868 A | 10/1999 | Bornhorst et al. |
| 5,975,720 A | 11/1999 | Adkins |
| 5,997,154 A | 12/1999 | Cooper et al. |
| 6,053,623 A | 4/2000 | Jones et al. |
| 6,072,633 A | 6/2000 | Park et al. |
| 6,076,948 A | 6/2000 | Bukosky et al. |
| 6,089,730 A | 7/2000 | Machii |
| 6,132,072 A | 10/2000 | Turnbull et al. |
| 6,147,806 A | 11/2000 | Park et al. |

* cited by examiner

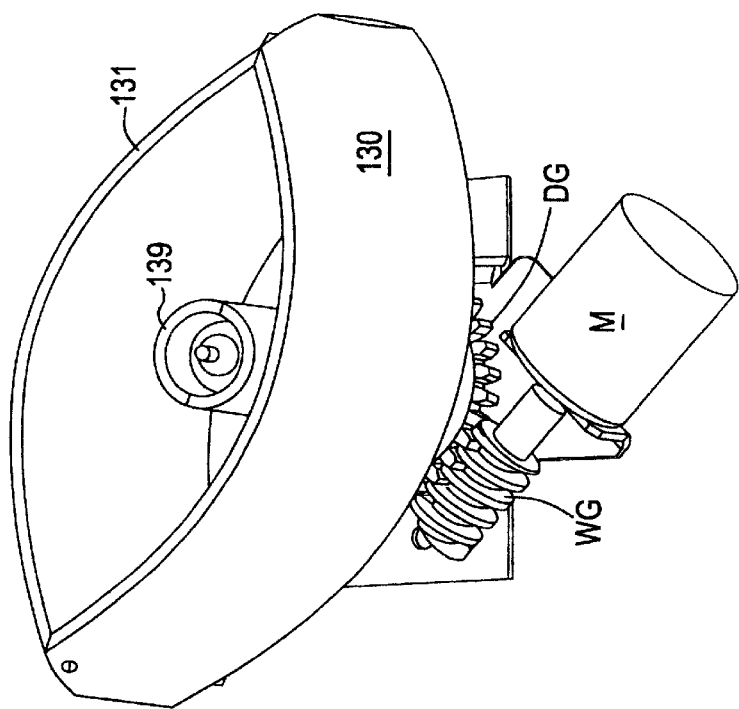
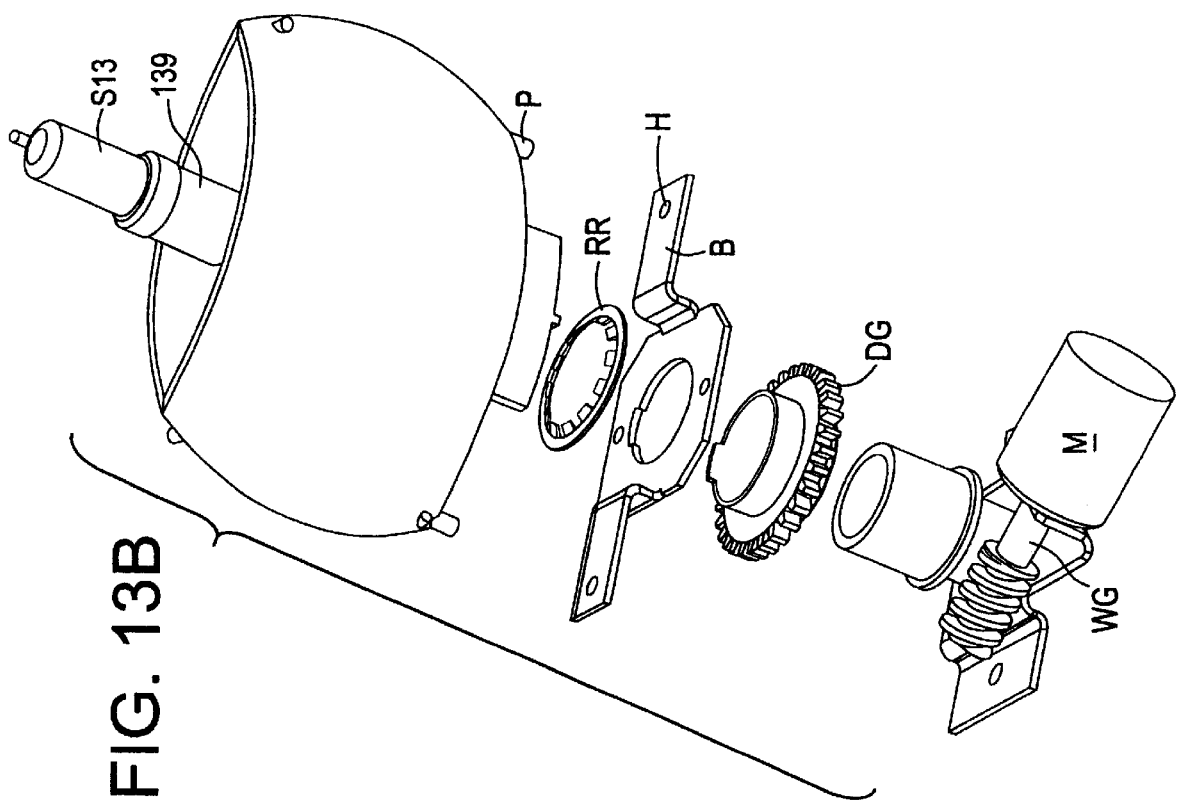

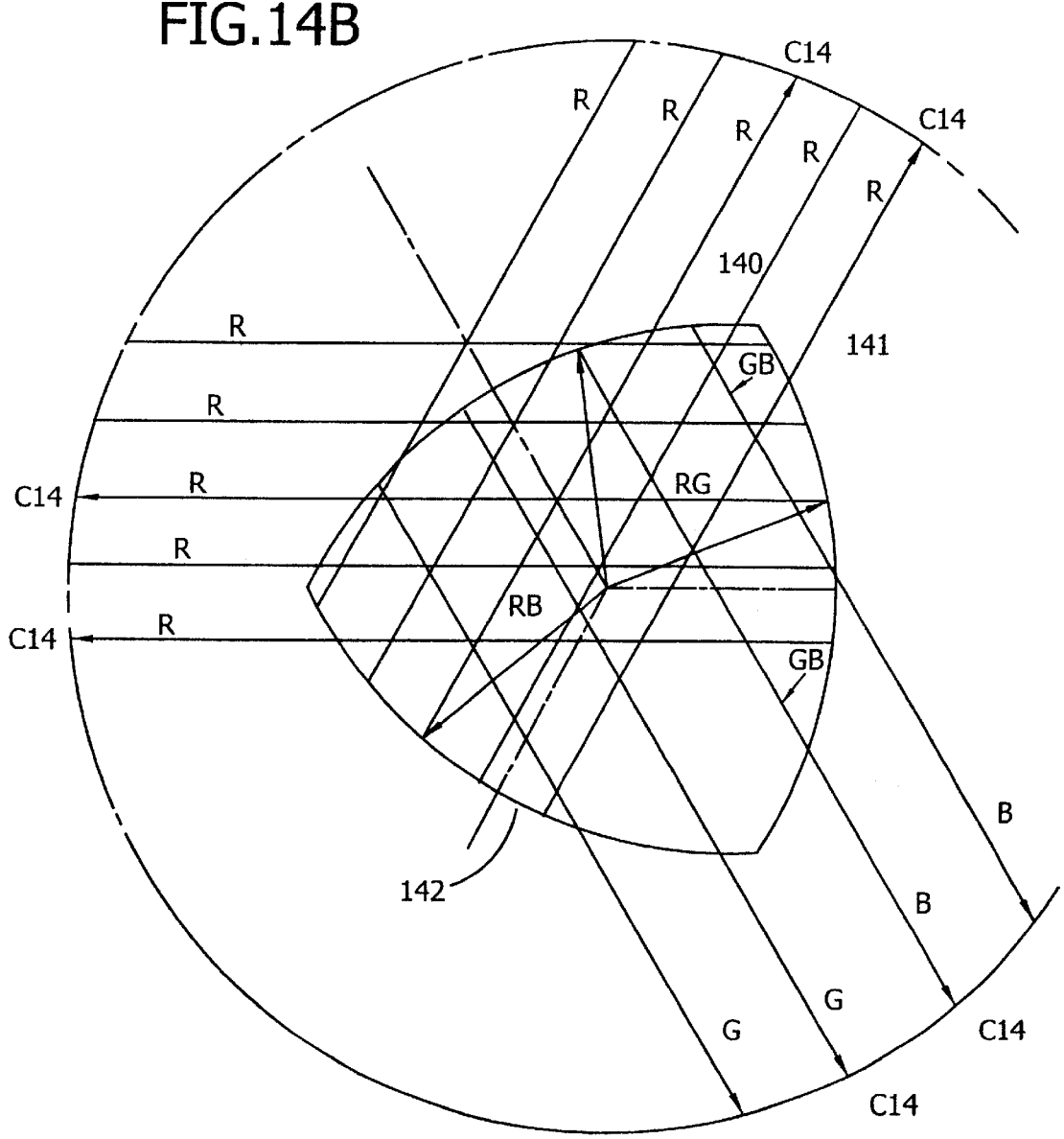

VEHICULAR WARNING LIGHT WITH TWO OR MORE DICHROIC ELEMENTS

FIELD OF THE INVENTION

The invention generally relates to warning lights and, in particular, to emergency vehicle lighting, vehicle light bars and vehicle warning lights having one or more dichroic elements for creating multiple visible light signals of varying colors.

BACKGROUND OF THE INVENTION

The use of absorptive filters in light bars and warning lights for emergency vehicles is well known. One major disadvantage with such absorptive filters is that they absorb light and thereby reduce the intensity of warning signals being provided to observers. In addition, the absorbed light creates heat in the absorptive filter which can be problematic.

There is a continuing need for warning lights which generate brighter signals, varying colored signals and multiple signals because such lights are usually more visible and usually are more effective in alerting observers. In addition, there is a continuing need to reduce power supply requirements. Although absorptive filters with multiple light sources may increase visibility, such a combination requires more power. Therefore, there is a need for warning lights which produce more visible signals without the concomitant increase in power needs.

SUMMARY OF THE INVENTION

In general, the invention meets the need for such warning lights in the form of a dichroic element in combination with a visible light source for use on a vehicle, particularly an emergency vehicle, to create a warning light signal provided to observers remote from the vehicle to alert the observers of the vehicle's position.

In particular, the warning light of the invention provides many significant advantages over the prior art warning lights. For example, the invention provides the ability to efficiently generate multiple useable colors of light from a single visible light source. In addition, the invention provides more light signals in less occupied space for the same amount of amperage and for less absorbed heat than presently available conventional warning lights. Also, the warning signals of the invention tend to provide brighter photometrics for each color due to the ability to utilize various dichroic coatings providing complete color bands. The selectivity of dichroic coatings allows an entire allowable color band to be utilized. Further, the multicolor capability of the invention provides a very effective set of signals in a minimum amount of space. The use of a reduced number of light sources permits warning lights to have lower cost.

Other objects and features will be in part apparent and in part pointed out hereinafter.

In one form, the invention comprises an apparatus for a vehicle including a visible light source and a dichroic element. The visible light source is adapted to be mounted on the vehicle for generating visible light to be used to create warning signals which are viewed by observers remote from the vehicle. The dichroic element is adapted to be mounted on the vehicle and adjacent to the visible light source to transmit at least some of the visible light generated by the light source and to reflect at least some of the visible light generated by the light source. The reflected light provides a warning light signal within a wavelength range when viewed by an observer remote from the vehicle.

In another form, the invention comprises an apparatus for a vehicle including a visible light source and a dichroic element. The visible light source is adapted to be mounted on the vehicle for generating visible light to be used to create warning signals which are viewed by observers remote from the vehicle. The dichroic element is adapted to be mounted on the vehicle and adjacent to the visible light source to transmit at least some of the visible light generated by the light source and to reflect at least some of the visible light generated by the light source. The transmitted light provides a first warning light signal within a first wavelength range when viewed by an observer remote from the vehicle. The reflected light provides a second warning light signal within a second wavelength range different than the first wavelength range when viewed by an observer remote from the vehicle.

In another form, the invention comprises an apparatus for a vehicle including a visible light source and a dichroic element. The visible light source is adapted to be mounted on the vehicle for generating visible light to be used to create warning signals which are viewed by observers remote from the vehicle. The dichroic element is adapted to be mounted on the vehicle and adjacent to the visible light source to transmit at least some of the visible light generated by the light source and to reflect at least some of the visible light generated by the light source. The transmitted light provides a first warning light signal having a first color when viewed by an observer remote from the vehicle. The reflected light provides a second warning light signal having a second color different than the first color when viewed by an observer remote from the vehicle.

In yet another form, the invention comprises a warning light mounted on a vehicle. The improvement comprises a visible light source and a dichroic element. The visible light source on the vehicle generates visible light to be used to create warning signals which are viewed by observers remote from the vehicle. The dichroic element on the vehicle and adjacent to the visible light source transmits at least some of the visible light generated by the light source and reflects at least some of the visible light generated by the light source. The transmitted light provides a first warning light signal within a first wavelength range when viewed by an observer remote from the vehicle. The reflected light provides a second warning light signal within a second wavelength range different than the first wavelength range when viewed by an observer remote from the vehicle.

In another form, the invention comprises apparatus for a vehicle including a visible light source, a first dichroic element and a second dichroic element. The visible light source is adapted to be mounted on the vehicle for generating visible light to be used to create warning signals which are viewed by observers remote from the vehicle. The first dichroic element is adapted to be mounted on the vehicle and adjacent to the visible light source to reflect at least some of the visible light generated by the light source. The light reflected by the first element provides a first warning light signal within a first wavelength range when viewed by an observer remote from the vehicle. The second dichroic element is adapted to be mounted on the vehicle and adjacent to the visible light source to reflect at least some of the visible light generated by the light source. The light reflected by the second element provides a second warning light signal within a second wavelength range when viewed by an observer remote from the vehicle.

In another form, the invention comprises an apparatus for a vehicle including a visible light source, a first dichroic element and a second dichroic element. The visible light source is adapted to be mounted on the vehicle for generating visible light to be used to create warning signals which are viewed by observers remote from the vehicle. The first dichroic element is adapted to be mounted on the vehicle and adjacent to the visible light source to transmit at least some of the visible light generated by the light source and to reflect at least some of the visible light generated by the light source. The reflected light provides a first warning light signal within a first wavelength range when viewed by an observer remote from the vehicle. The second dichroic element is adapted to be mounted on the vehicle and adjacent to the visible light source to transmit at least some of the visible light transmitted by the first dichroic element to provide a second warning signal within a second wavelength range different than the first wavelength range when viewed by an observer remote from the vehicle. The second dichroic element reflects at least some of the visible light transmitted by the first dichroic element to provide a third warning signal within a third wavelength range different than the first and second wavelength ranges when viewed by an observer remote from the vehicle.

In yet another form, the invention comprises an apparatus for a vehicle including a visible light source, a first dichroic element and a second dichroic element. The visible light source is adapted to be mounted on the vehicle for generating visible light to be used to create warning signals which are viewed by observers remote from the vehicle. The first dichroic element is adapted to be mounted on the vehicle and adjacent to the visible light source to transmit at least some of the visible light generated by the light source and to reflect at least some of the visible light generated by the light source. The reflected light provides a first warning light signal within a first wavelength range when viewed by an observer remote from the vehicle. The second dichroic element is adapted to be mounted on the vehicle and adjacent to the visible light source to transmit at least some of the visible light reflected by the first dichroic element to provide a second warning signal within a second wavelength range different than the first wavelength range when viewed by an observer remote from the vehicle. The second dichroic element reflects at least some of the visible light reflected by the first dichroic element to provide a third warning signal within a third wavelength range different than the first and second wavelength ranges when viewed by an observer remote from the vehicle.

In another form, the invention comprises a method of making a warning light having a substrate with a dichroic coating thereon and having a light source. The warning light generates a visual warning signal including light having a particular wavelength range. The method comprises the steps of:

selecting a light source which emits light within the particular wavelength range;

selecting a dichroic coating which transmits or reflects light within the particular wavelength range; and positioning the substrate to intersect light emitted by the light source whereby the intersected light is transmitted or reflected by the dichroic coating to form the warning signal.

In another form, the invention comprises a method of making a warning light having a substrate with a dichroic coating thereon and having a light source. The warning light generates a visual warning signal including light having a particular wavelength range. The method comprises the steps of:

selecting a dichroic coating which reflects light within the particular wavelength range; and positioning the substrate to intersect light emitted by the light source whereby the intersected light is reflected by the dichroic coating to form the warning signal.

BRIEF DESCRIPTION OF THE DRAWINGS

FIGS. 13A–13H are schematic diagrams of two parabolic reflectors in opposed relation to and contiguous to each other, each reflector having a dichroic coating.

FIGS. 14A–14D are schematic diagrams of three parabolic reflectors contiguous to each other, each reflector having a dichroic coating.

Corresponding reference characters indicate corresponding parts throughout the drawings.

DETAILED DESCRIPTION OF THE PREFERRED EMBODIMENTS

Figure 1:
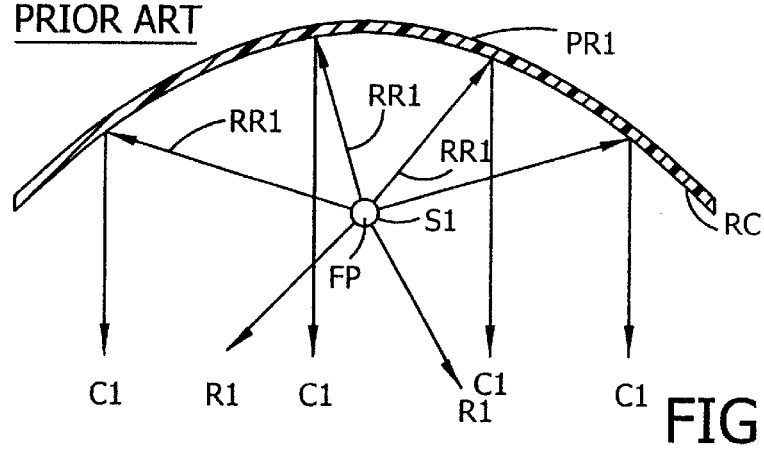
FIG. 1 is a prior art schematic drawing illustrating the path of light radially emitted from a light source located at the focal point of a parabolic reflector.

Dichroic elements provide a significant advantage in vehicle warning lighting because they separate light into its multicolor constituents and they allow multiple colored light signals from a single visible light source and such dichroic elements minimize the absorbed light and minimize loss of intensity resulting from any absorption. As used herein, a dichroic element may be any substrate which transmits certain wavelengths and reflects other wavelengths. A dichroic element includes a substrate which carries a dichroic coating on any of its surfaces or which may inherently transmit certain wavelengths and reflect other or which may be impregnated with a dichroic material. The substrate may also be an absorptive filter and may have optical elements such as facets or lenses to divert or form the light. As used herein, a visible light source may be a lamp, a lamp and reflector, a light pipe, a strobe, a luminescent emitter, incandescent emitter, a fluorescent emitter, a non-monochromatic source, or any other element or device which supplies visible light within a desired spectral range. As used herein, a dichroic element of a particular color is assumed to transmit light of that color and reflect other colors. For example, a red dichroic element would transmit red light and reflect green and blue light. However, it is also contemplated that a red dichroic element could reflect red light and transmit other colors so that any of the embodiments described herein may be implemented by taking advantage of either the transmissive or reflective properties of dichroic elements. In particular, embodiments can be developed by selecting dichroic coatings which transmit certain wavelengths or by selecting dichroic coatings which reflect certain wavelengths. The discussion herein concentrates on the transmissive properties of dichroics and on the transmission of the primary colors (R=red, B=blue, G=green) by way of example only and for convenience. It is contemplated that any structure or warning signals described or claimed herein may be implemented in any visible color either by the transmissive properties of dichroic coatings or by the reflective properties of dichroic coatings or by a combination of both the transmissive and reflective properties.

It has been found that a light bar or other warning light fixture in combination with a dichroic element embodies an efficient emergency and/or warning signaling device in that very little light is lost to absorption and almost all visible light may be transmitted in various wavelength ranges. This is because dichroic elements transmit or reflect light and tend to absorb very little light. By using both the transmitted and the reflected light to create warning signals, essentially no light is lost and the intensity of the light signals is not reduced by absorptive filters. Also, dichroic elements tend to transmit more light within a given color range than absorptive filters. For example, a blue dichroic element may be designed to transmit more blue light in a wider blue spectrum than a blue absorptive filter to provide more blue light as a warning signal.

In general, dichroic coated filters may be used to separate a beam of visible light into its multi-colored components of different wavelength ranges of light so that such light components can be used to generate warning signals of multiple colors such as red, yellow or blue. When used with a stationary light in conjunction with mirrors and dichroic filters, the invention projects the various colors in various directions or sequences to enhance visibility of the light by an observer. In another operating example, a single rotating light source uses mirrors and dichroic filters to project certain multicolored light signals in one direction and other multicolored light signals in another direction. The possibility of combinations is great since the dichroic element can both transmit and reflect light. It is also possible to attach the dichroic element directly to a rotating, oscillating, flashing or stationary reflector and/or light source. Sometimes, a dichroic element is referred to as a color divider or a dichromatic device. In some embodiments, dichroic elements comprise transparent substrates having a dichroic coating thereon. The following discusses various embodiments of the invention in greater detail.

FIG. 1 is a prior art schematic drawing illustrating the path of light radially emitted from a light source S1 located at a focal point FP of a parabolic reflector PR1 shown in cross section from a top view. The radially emitted light generates two patterns. First, a radial pattern designated by the light rays R1 proceeds directly from the light source S1 to an observer in front of the parabolic reflecting surface PR1. Since the light rays R1 are radially diverging, this light pattern is less desirable for use as an emergency or other warning signal because the intensity of the pattern diminishes exponentially in proportion to the distance between the source and the observer. A second light pattern is formed by the radially reflected rays RR1 which are reflected as collimated rays C1 to form a beam of parallel light. This collimated light beam is more desirable for use in generating warning signals because its initial intensity is greater and it forms a brighter signal than radially diverging light from a source that has not been formed into a beam.

Figure 2A:
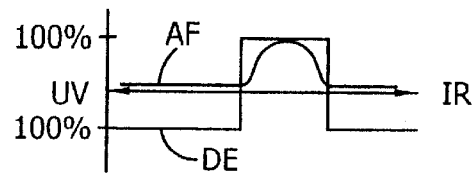
FIG. 2A is a graph showing the general difference in transmitivity T and reflectivity R of an absorptive filter AF and a dichroic element DE, both transmitting the same approximate wavelength range (color band).
Figure 2B:
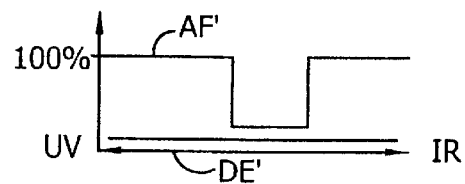
FIG. 2B is a graph showing the difference in absorptivity of an absorptive filter AF' and a dichroic element DE'.
Figure 2:
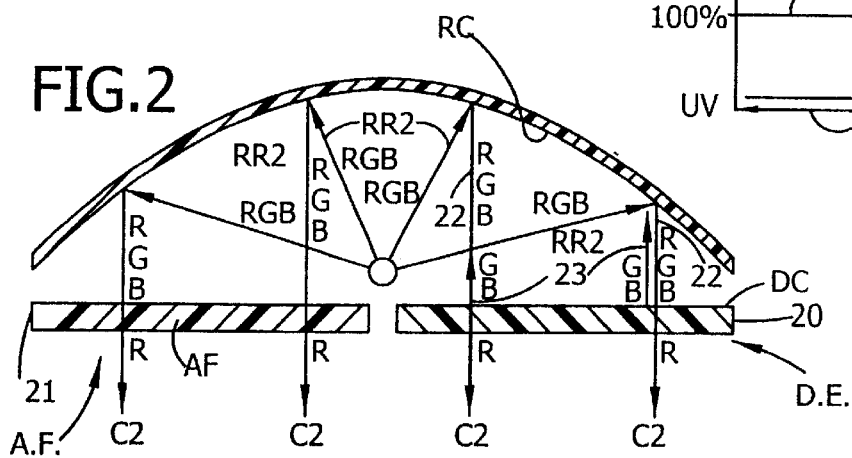
FIG. 2 is schematic drawing illustrating the path of light from a light source at a focal point of a parabolic reflecting surface having a dichroic element and an absorptive filter positioned in line with the collimated light beam reflected by the reflector.

FIG. 2 is a schematic drawing illustrating the path of collimated light from a parabolic reflector PR2 having a flat dichroic element 20 in the collimated beam and normal to it and also having a flat absorptive filter 21 in the collimated beam and normal to it. As used herein, a parabolic reflector means any reflector which forms a beam of light. Such reflectors would include faceted reflectors, discrete and/or compound surfaces which tend to form a beam of light or any other reflective surface or lens element which tends to shape light into a beam. Such reflectors generally have a point or line or plane defining a space of preferred location for a light source. As used herein, such space is generally referred to as a focal point. Also, such beams are generally referred to herein as collimated although it is recognized that the light rays of such beams may diverge.

When viewing FIG. 2, the dichroic element 20 is on the right side of the parabolic or other beam forming reflector PR2 and the absorptive filter 21 is on the left side. As with FIG. 1, it is assumed that the light source S2 is located at the focal point of the parabolic reflecting surface PR2. For simplicity, the radial light rays (R1 in FIG. 1) which do not strike the parabolic reflecting surface PR2 are not illustrated in FIG. 2. FIG. 2 is intended to illustrate some of the differences between a dichroic element 20 and an absorptive filter 21. FIG. 2A is a graph showing the difference in transmitivity T and reflectivity R of a red absorptive filter AF and a red (transmitting) dichroic element DE along the entire visible spectrum from ultraviolet (UV) to infrared (IR). In general, the line DE shows that a dichroic element transmits generally all red light and reflects generally all other visible light. (Although the line DE is illustrated as a square wave, it is recognized that in practice this line would vary depending on the type of dichroic coating selected.) In contrast, the line AF shows that an absorptive filter transmits certain red light (not a generally square wave) and absorbs generally all other visible light. FIG. 2B is a graph showing the difference in absorptivity A of a red absorptive filter AF' and a red dichroic element DE' along the entire visible spectrum from ultraviolet (UV) to infrared (IR). In general, the line DE' shows that a dichroic element does not absorb any substantial light whereas the line AF' shows that an absorptive filter absorbs substantially all light which is not transmitted.

For example, referring to FIG. 2, assume that absorptive filter 21 is a red absorptive filter which passes red light and absorbs generally all other colors of light. The radially reflected rays of visible light RR2 would have a red component R, a green component G, and a blue component B, all of which would be reflected and be directed toward the absorptive filter 21. Being a conventional tinted transparency which absorbs non-transmitted energy, absorptive filter 21 would allow the red component R to pass through the absorptive filter 21 and would absorb the green component G and the blue component B. As a result, collimated light rays C2 passing through absorptive filter 21 only have a red component R and the green and blue components G, B are absorbed and subsequently are converted to heat in the filter.

In contrast, on the right side of the parabolic reflector PR2, a radial ray RR2 forms a reflected ray 22 having components R, G and B directed toward the dichroic element 20. However, by definition, a dichroic element or dichroic filter transmits light in one wavelength range and reflects light in the other wavelength ranges. Therefore, assuming that the dichroic element 20 is a red element (sometimes called a red dichroic filter), the dichroic element 20 will allow the red component R to pass through and will reflect the green component G and the blue component B to create a reflected light ray noted by reference character 22. (Rays 22 and 23 are essentially collinear but are shown as separate, parallel rays for illustration purposes only.) This reflected ray 23 would then be reflected by the parabolic reflecting surface PR2 and be directed back toward the source S2. FIG. 2 illustrates one advantage of dichroic elements. In particular, with a dichroic element such as element 20, the desired wavelength range or color (R) can be transmitted and the rest of the optical spectrum (G, B) is reflected; thus, a dichroic element 20 will absorb less heat and will reflect other spectra which can be potentially used to create other emergency or warning light signals.

Dichroic coatings DC can be selected or designed to pass certain wavelength ranges and to reflect other wavelength ranges. Referring to FIGS. 2A and 2B, this means that the location of the square wave of lines DE and DE' can be selected to be in various places along the visible light spectrum and that the width of the square wave can be varied. In addition, more than one square wave can be designed. In addition, a single dichroic coating can be designed to transmit or reflect multiple wavelength ranges simultaneously. For example, a dichroic element may transmit red light (600–610 nm) and blue light (500–510 nm) and reflect other light such as light below 500 nm in wavelength, light in the range of 511–599 nm and light above 610 nm in wavelength. In one aspect, the invention comprises a method of making a warning light having a substrate with a dichroic coating thereon and having a light source S2. The warning light is designed to generate a visual warning signal including light having a particular wavelength range. The method comprises the following steps. Depending on the type of light source, e.g., halogen, strobe, incandescent, etc, each light source emits light in different spectra. Therefore, in one step of the method, a light source S2 which emits light within the particular wavelength range is selected. Another step involves selecting a dichroic coating which transmits or reflects light within the particular wavelength range. After the source and dichroic coating are selected, a substrate having the dichroic coating DC such as element 21 is positioned to intersect light emitted by the light source whereby the intersected light is transmitted or reflected (see FIG. 4 et seq.) by the dichroic coating to form the warning signal. If the spectra emitted by the light source is generally acceptable, a more general method of making a warning light having a substrate with a dichroic coating thereon may be employed. This method comprises the steps of:

selecting a dichroic coating which reflects light within the particular wavelength range; and positioning the substrate to intersect light emitted by the light source whereby the intersected light is reflected by the dichroic coating to form the warning signal. Either method results in a warning light which provides a warning signal in a particular, desired wavelength.

Although the dichroic element 20 is shown as a plastic substrate, it may be any clear or optically transparent material and may be tinted to absorb undesirable wavelengths.

Figure 3:
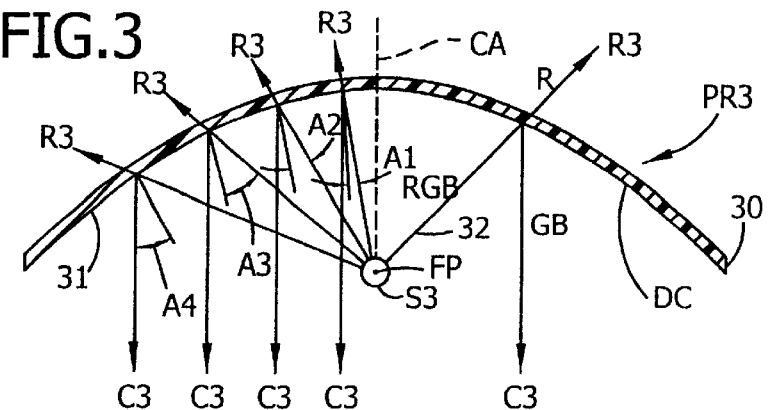
FIG. 3 is a schematic drawing illustrating the varying angles of incidence of radial light reflected by a parabolic reflector having a dichroic coating.

FIG. 3 is a schematic drawing illustrating the varying angles of incidence A of radial light from a source S3 reflected by a parabolic or other beam forming reflector PR3 comprising a transparent substrate 30 having a dichroic coating DC on its interior or concave surface (although it is contemplated that the coating may be on the convex surface or different dichroic coatings may be applied to each of the surfaces). Again, it is assumed that the light source S3 is located at the focal point of the parabolic reflecting surface PR3. In general, it is noted that the angle of incidence A (the angle of a source ray with respect to the surface normal) is near zero adjacent to the central axis CA of the parabolic reflector PR3 whereas the angle of incidence A approaches 90° toward the outer edges of the parabolic reflector PR3. As indicated in FIG. 3, as the reflected rays are reflected from a point on the parabolic reflecting surface PR3 that moves outward from the central axis A to the edges of the surface PR3, the angle of incidence increases (i.e., $0<A1<A2<A3<A4$). Accordingly, it is contemplated that dichroic elements of the invention may comprise a substrate having a dichroic coating which has an orientation which minimize variations in transmitivity as the angle of incidence of light impinging on the coating varies. In general, it is noted that certain dichroic coatings DC have an angle limit to achieve a specific color (e.g., certain blue dichroic coatings will transmit blue light which impinges perpendicularly to the coated surface and will transmit lower wavelength light which impinges at a 45 degree angle to the coated surface). This is accomplished by shielding the light source and prevent light at unwanted angles from impinging on the coating. Another solution is to orient or apply the coating to minimize sensitivity to the angle of incidence.

By way of example only, it is assumed that the dichroic coating DC is a red dichroic coating which transmits red light and reflects other light spectrums. For example, a ray of visible light 32 from the light source S3 would have R, G and B components and would transmit a ray R3 having a red component R while reflecting the G and B components to create a collimated beam of light C3. As a result, a parabolic surface made of a transparent material 30 and coated with a dichroic coating DC to transmit a specific spectra in a particular wavelength range provides two separate color signals from a single light source S3: (1) the radially red component R3 and (2) the collimated G, B components C3. Such radial components provide some benefit and in certain configurations add to the intensity of the collimated beam. When such a structure is rotated, which is contemplated, radial components as discussed herein provide a contrast with the collimated beams so that an observer would see a pulsating light including a less intense color signal from the radial light and a more intense color signal from the collimated light (depending on the observer's position).

This example in FIG. 3 assumes that the dichroic coating DC is not sensitive to the angle of incidence A because, as illustrated, the angle of incidence A changes depending on the position of the ray when it strikes the parabolic reflector PR3, which angle depends on the distance of this position from the central axis CA. Certain dichroic coatings are sensitive to the angle of incidence A and will transmit different wavelength ranges depending on the angle of incidence so that the radially transmitted rays R3 may have other components in addition to or in place of the red components. Similarly, the collimated light C3 reflected by the dichroic coating DC would have other components than the G and B components. In order to minimize the effect of the angle of incidence A, the invention contemplates that the dichroic coating DC may be applied to the parabolic reflector PR3 in such a way that the coating is oriented so that the parabolic reflector PR3 transmits light in a given range along its entire periphery.

Unless otherwise indicated, the figures herein (particularly FIGS. 1–11 and 13A–15C) generally illustrate top views of a horizontal cross section of structures adapted to be mounted on a light bar and/or vehicle. It is contemplated that these structures may be stationary or oscillated or rotated about an axis (usually a vertical axis) or that these structures may be used to provide warning signals in directions other than as illustrated herein. Also, in general, such structures may be used to identify moving vehicles, parked or semi-stationary vehicles or any other traffic control barriers. For convenience, only one variation and one orientation of most structures have been illustrated although other variations and/or orientations are contemplated.

Figure 4:
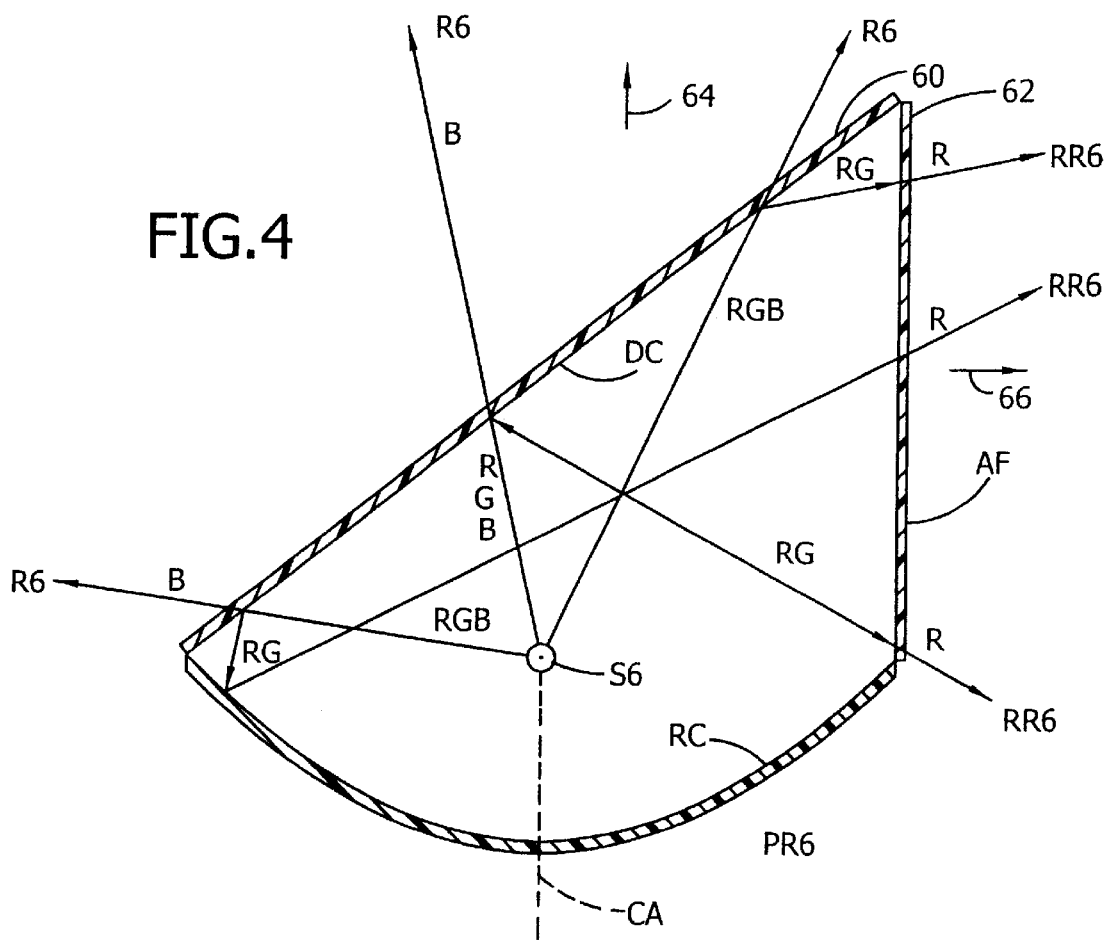
FIGS. 4, 5, 6A and 6B are schematic diagrams of a parabolic reflector in combination with dichroic elements and absorptive filters.
Figure 5:
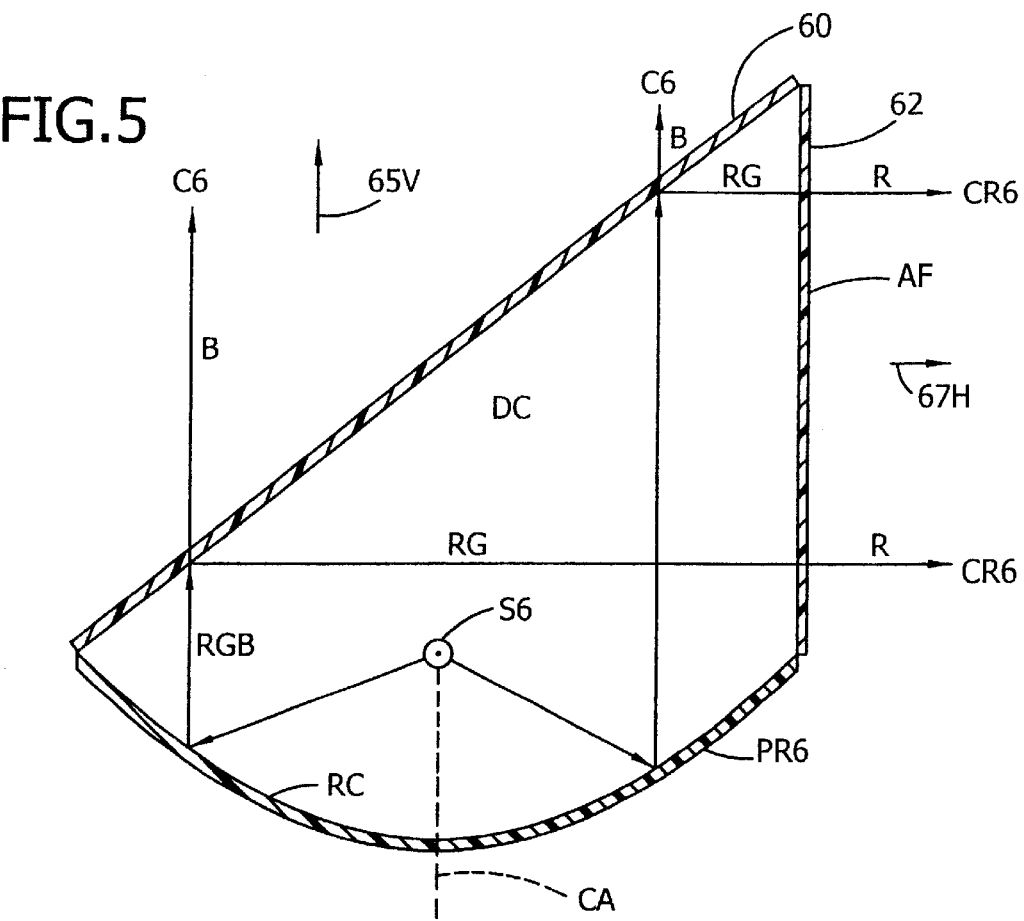

FIGS. 4 and 5 are schematic diagrams of a parabolic or other beam forming reflector PR6 in combination with a dichroic element 60 and an absorptive filter 62. In this embodiment, the absorptive filter 62 is a flat absorptive filter having a planar surface which is oriented generally vertical and parallel to the central axis CA of the parabolic reflector PR6. The dichroic element 60 is positioned at an angle of approximately 45° with the absorptive filter 62. One end of the absorptive filter 62 is contiguous to the right end of the parabolic reflector PR6. The other end of the absorptive filter 62 is contiguous to one end of the dichroic element 60. The other end of the dichroic element 60 is contiguous to the left end of the parabolic reflector PR6. In this configuration, light is either transmitted or reflected by the dichroic element 60 or reflected by element 60 and filtered by the absorptive filter 62.

Assuming that the dichroic element 60 is a blue dichroic element and assuming that the absorptive filter 62 is a red absorptive filter, the signals created by the apparatus are illustrated in FIGS. 4 and 5. In particular, FIG. 4 illustrates the radially diverging rays and FIG. 5 illustrates the collimated rays. Referring to FIG. 4, from the radial light rays R6 generated by the source S6 located at the focal point of the parabolic reflector PR6, a blue diverging light beam is created. In addition, the red and green components are reflected by the dichroic element 60 and filtered by the red absorptive filter 62 to create diverging rays RR6 of red light. Referring to FIG. 5, the radial light reflected by the parabolic reflector PR6 creates a collimated light beam of rays C6 having only blue components after they pass through the dichroic element 60. The red and green components of these collimated light rays C6 forming the collimated beam are reflected by dichroic element 60 and filtered by the red absorptive filter 62 to create a collimated red beam of rays CR6. Therefore, four types of light signals are generated by this single apparatus: (1) a diverging signal 64 of blue light rays R6, (2) a collimated signal 65V of blue light rays C6, (3) a diverging signal 66 of red light rays R6 and RR6, and (4) a collimated signal 67H of red light rays CR6. If this apparatus of FIGS. 4 and 5 is rotated, which is contemplated, then an observer would observe six signals. For example, if the apparatus of FIGS. 4 and 5 is rotated clockwise, an observer positioned at the bottom or south of the apparatus would see: (1) a lower intensity red signal 66 of diverging red light, (2) followed by a higher intensity red signal 67H of collimated red light, (3) followed by a lower intensity red signal 66 of diverging red light, (4) followed by a lower intensity blue signal 64 of diverging blue light, (5) followed by a higher intensity blue signal 65V of collimated blue light, (6) followed by a lower intensity blue signal 64 of diverging blue light.

Figure 6A:
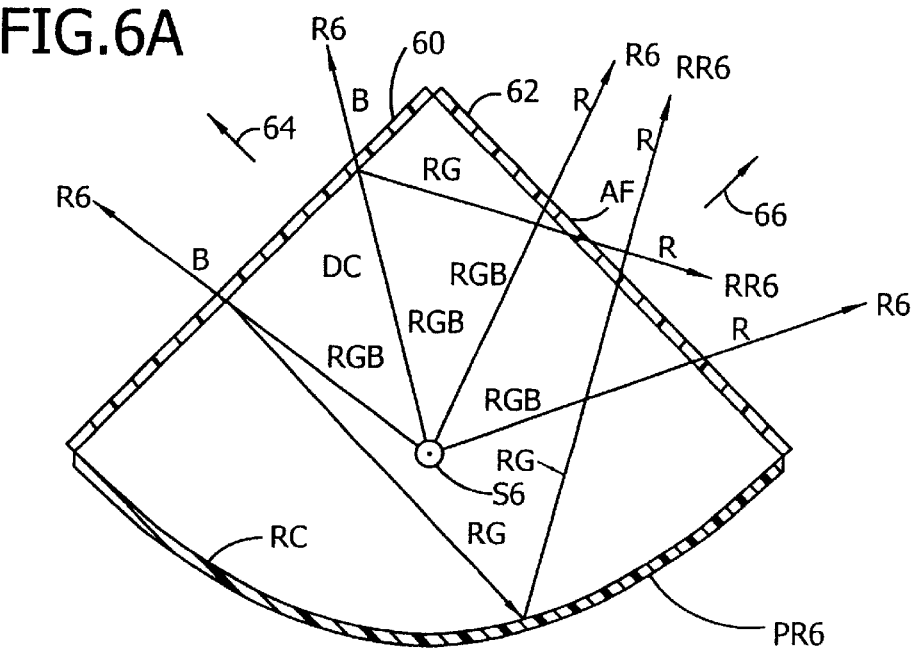
Figure 6B:
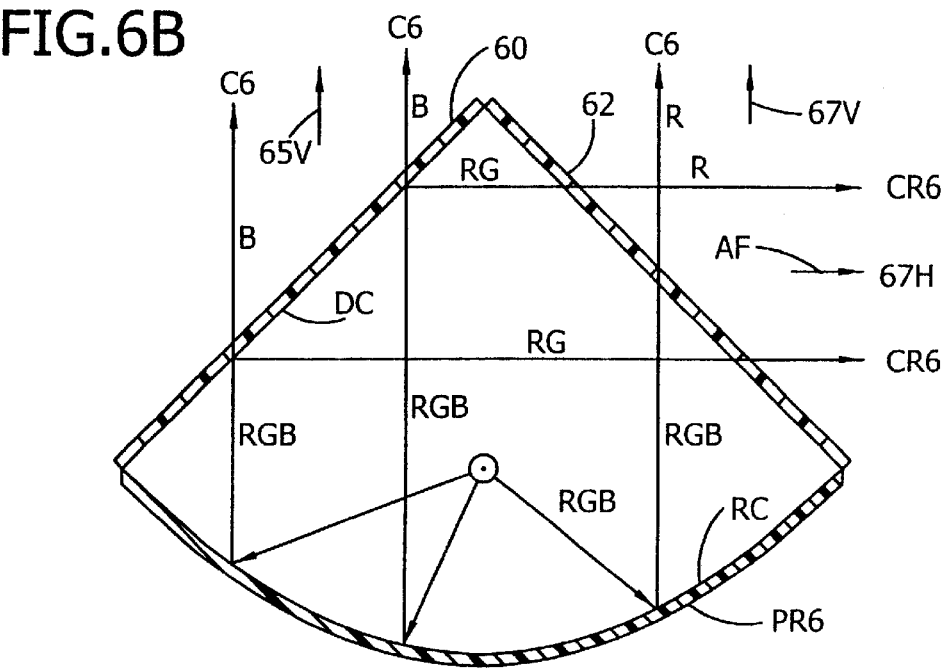

FIGS. 6A and 6B are another schematic diagram of parabolic reflector PR6 in combination with dichroic element 60 and absorptive filter 62, similar to FIGS. 4 and 5. In this embodiment, the dichroic element 60 is positioned at an angle of approximately 90° with respect to the absorptive filter 62. Assuming that the dichroic element 60 is a blue dichroic element and assuming that the absorptive filter 62 is a red absorptive filter, the following signals are created by the apparatus illustrated in FIG. 6A. Referring to FIG. 6A, from the radial light rays R6 generated by the source S6, a blue diverging light beam and a red diverging light beam are created. In addition, the red and green components of R6 are reflected by the dichroic element 60 and filtered by the red absorptive filter 62 to create diverging rays RR6 of red light. In addition, some of the red and green components are also reflected by parabolic reflector PR6 to create diverging rays RR6 of red light. Referring to FIG. 6B, the radial light from light source S6 located at the focal point, reflected by the parabolic reflector PR6 and creates a collimated light beam of rays C6 having blue components after they pass through the dichroic element 60 on the left side of the apparatus and having red components after they pass through the absorptive filter 62 on the right side of the apparatus. The red and green components of the collimated light rays C6 forming the collimated beam are also reflected by dichroic element 60 and filtered by the red absorptive filter to create a collimated red beam of rays CR6. Therefore, four types of light signals are generated by this single apparatus: (1) a diverging signal 64 of blue light rays R6, (2) a collimated signal 65 of blue light rays C6, (3) a diverging signal 66 of red light rays R6 and RR6, and (4) a collimated signal 67V, 67 of red light rays C6 and CR6. If this apparatus is rotated, which is contemplated, then an observer would observe six signals. For example, if the apparatus of FIGS. 6A and 6B is rotated clockwise, an observer positioned at the bottom or south of the apparatus would see: (1) a lower intensity red signal 66 of red diverging light, (2) followed by a higher intensity red signal 67 of collimated red light, (3) followed by a lower intensity red signal 66 of diverging red light, (4) followed by a higher intensity red signal 67V of collimated red light, (5) followed by a higher intensity signal 65 of collimated blue light, (6) followed by a lower intensity signal 64 of diverging blue light.

Figure 7:
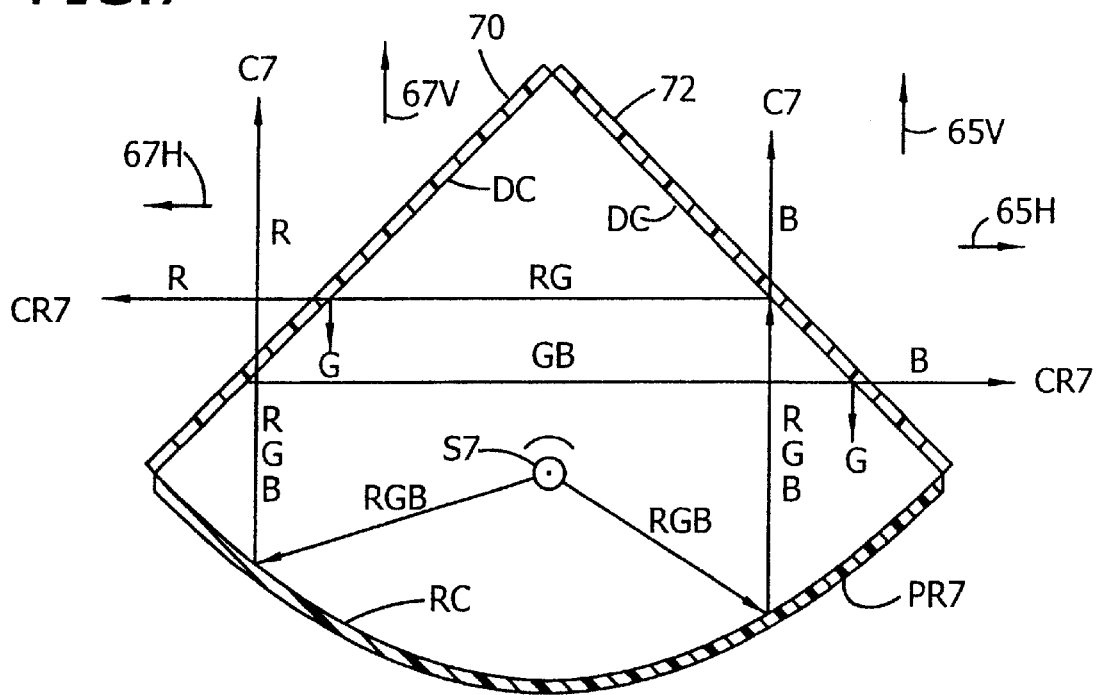
FIG. 7 is a schematic diagram of a parabolic reflector in combination with two dichroic elements.

FIG. 7 is a schematic diagram of a parabolic or other beam forming reflector PR7 in combination with two dichroic elements 70 and 72. In this embodiment, both dichroic elements are flat and are positioned at an angle of approximately 90° with respect to each other. One end of the dichroic element 70 is contiguous to the one end of the parabolic reflector PR7. The other end of the dichroic element 70 is contiguous to one end of the dichroic element 72. The other end of the dichroic element 72 is contiguous to the other end of the parabolic reflector PR7. In this configuration, light is either transmitted or reflected by the dichroic element 70 or by the dichroic element 72. An optional shield reflector SR7 such as a spherical reflector is positioned between the light source S7 and the dichroic elements 70 and 72 to reflect the light rays. In addition to minimizing diverging radial light, reflector SR7 also reduces power needs because more light is directed toward the reflector PR7 and such light is added to the beam which creates the warning signal. Therefore, a light source which consumes less power may be employed. If the light source is a strobe or other linear light source, reflector SR7 tends to be even more effective than a filament source because the strobe has no filament which could block some of the light reflected by the shield reflector SR7. It is also contemplated that the reflector SR7 may be implemented as a dichroic or reflective coating on the surface of the lamp itself which functions as the visible light source. Alternatively, shield reflector SR7 may absorb light rays radiating from the source S7 and impinging directly upon the dichroic elements. Therefore, in this embodiment, generally all light rays are reflected by the parabolic reflector PR7 to create only collimated light signals. As described above with regard to FIGS. 4, 5, 6A and 6B, it is contemplated that the shield reflector SR7 may be omitted so that a plurality of diverging light signals would also be transmitted.

Assuming that the dichroic element 70 is a red dichroic element and assuming that the dichroic element 72 is a blue dichroic element, the following signals are created by the apparatus illustrated in FIG. 7. The radial light reflected by the parabolic reflector PR7 creates a collimated light beam of rays C7 having only red components after they pass through the red dichroic element 70 and having only blue components after they pass through the blue dichroic element 72. The green and blue components of these collimated light rays C7 are reflected by dichroic element 70 and the blue component is transmitted by blue dichroic element 72 to create a collimated beam of blue light rays CR7 directed to the right. The green components of this beam are reflected by dichroic element 72 back toward the parabolic reflector PR7. Similarly, the collimated light beam of rays C7 have only blue components after they pass through the dichroic element 72. The red and green components of these collimated light rays C7 are reflected by dichroic element 72 and the red component is transmitted by the red dichroic element 70 to create a collimated beam of red light rays CR7 directed to the left. The green component is reflected by dichroic element 70 back toward the parabolic reflector PR7. Therefore, two types of light signals are generated by this single apparatus of FIG. 7: a blue collimated signal 65V, 65H of rays C7 and CR7 and a red collimated signal 67H, 67V of rays C7 and CR7. If this apparatus is rotated, which is contemplated, then an observer would observe four signals. For example, if the apparatus of FIG. 7 is rotated clockwise, an observer positioned at the bottom or south of the apparatus of FIG. 7 would see: (1) a collimated signal 65H of blue light rays CR7, (2) followed by a collimated signal 65V of blue light rays C7, (3) followed by a collimated signal 67V of red light rays C7, (4) followed by a collimated signal 67H of red light rays CR7. The second signal of blue collimated light and the third signal of red collimated light would be immediately adjacent to each other whereas there would be a brief period of no signal between the first and second signals and between the third and fourth signals.

Figure 8:
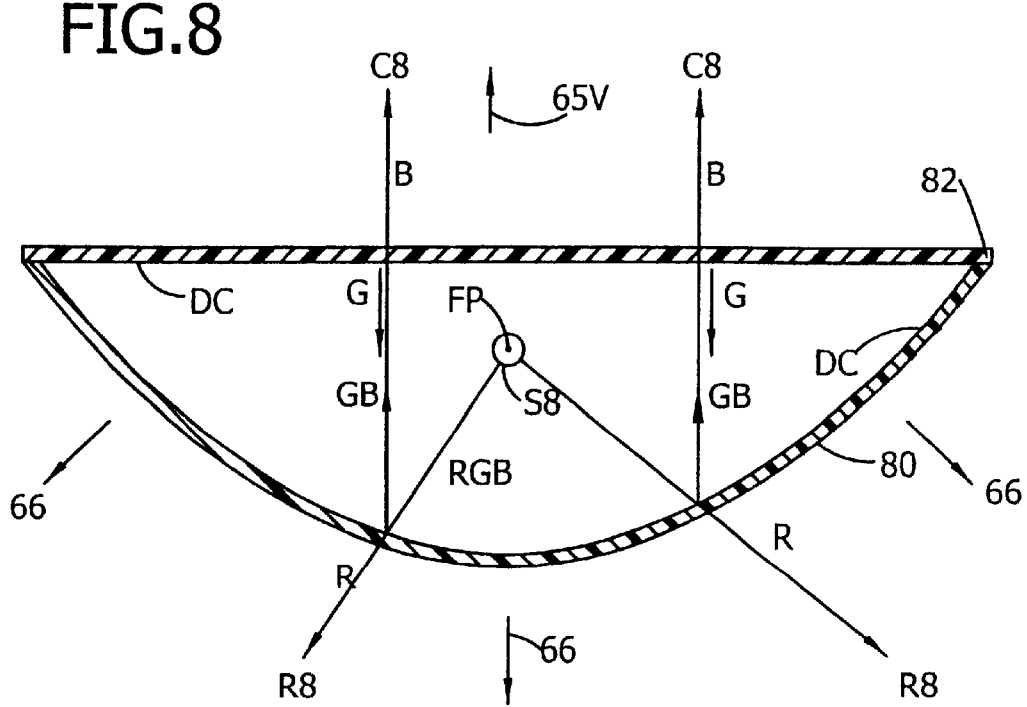
FIGS. 8 and 8A are schematic diagrams of a parabolic reflector in combination with a flat dichroic element wherein the reflector has a dichroic coating and a shield reflector is used.
Figure 8A:
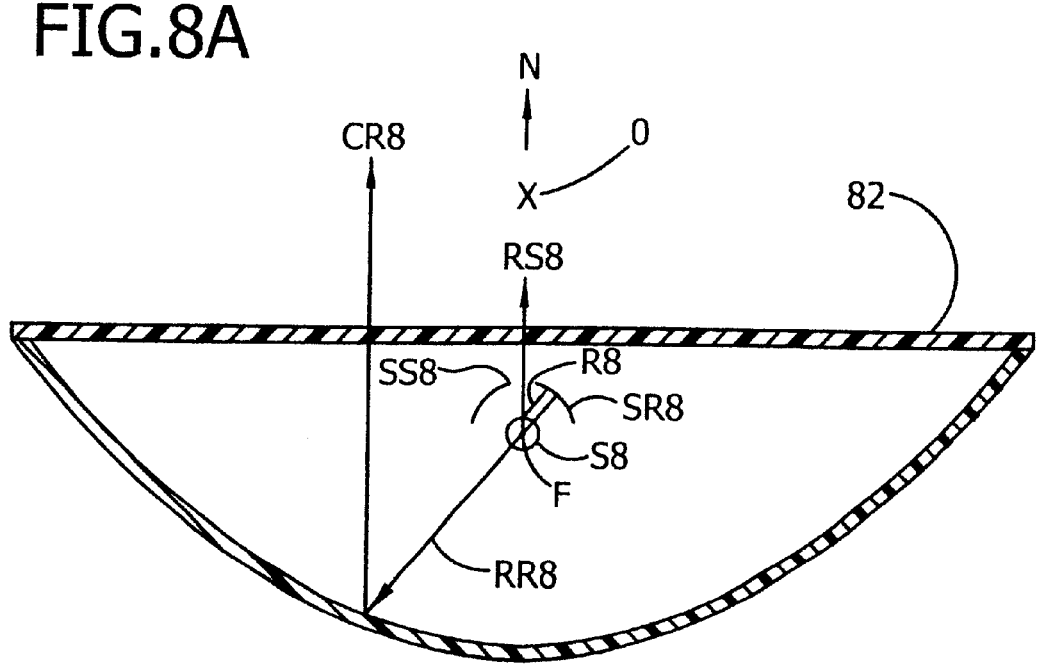

Referring to FIGS. 8 and 8A, a dichroic parabolic or other beam forming element 80 with dichroic coating DC in combination with a dichroic flat element 82 with dichroic coating DC is illustrated. As with the configuration illustrated in FIG. 7, an optional shield reflector SR8 is positioned between the light source S8 and the flat dichroic element 82 to eliminate radial light rays emanating directly from the light source SR8. As shown in FIG. 8A, reflector SR8 is either a mirror or dichroic element which reflects radial rays R8 to create radially reflected rays RR8 which are then reflected by reflector 80 to create collimated rays CR8. Reflector SR8 may be provided with an optional slot or opening SS8 so that an observer O at a position to the north of the structure of FIG. 8A would view the light rays RS8 directly radiated from the source SR8. Alternatively, if source S8 has a filament F, opening SS8 would permit an observer O to view the light RS8 radiating directly radiated from the filament F. Each end of the flat dichroic element 82 is contiguous to an end of the dichroic parabolic reflector 80. In this configuration generally all light is either transmitted or reflected by the dichroic parabolic reflector 80 or by the flat dichroic element 82. Assuming that the dichroic parabolic reflector 80 is a red dichroic element and assuming that the flat dichroic element 82 is a blue dichroic element, the following signals are created by the apparatus illustrated in FIG. 8. From the radial light rays R8 generated by the source S8 located at the focal point FP of the dichroic parabolic reflector 80, a red diverging light beam 66 is created. In addition, the green and blue components are reflected by the dichroic parabolic reflector 80 and the blue component is transmitted by the flat dichroic element 82 to create a collimated beam of blue light rays CR8. The green component of light rays CR8 is reflected by the flat dichroic element 82 back toward the dichroic parabolic element 80. Although element 82 is illustrated as a flat dichroic element, it is contemplated that it may also be an absorptive filter or some other shaped element or absorptive filter. Therefore, two types of light signals are generated by the apparatus of FIG. 8: a diverging signal 66 of red light rays R8 and a collimated signal 65V of blue light rays C8. If this apparatus is rotated, which is contemplated, then an observer would observe two signals of different colors. For example, if the apparatus of FIG. 8 is rotated clockwise, an observer positioned at the bottom or south of the apparatus of FIG. 8 would see: (1) a low intensity red signal 66 of diverging red light, (2) followed by a higher intensity blue signal 65V of collimated blue light.

Figure 9C:
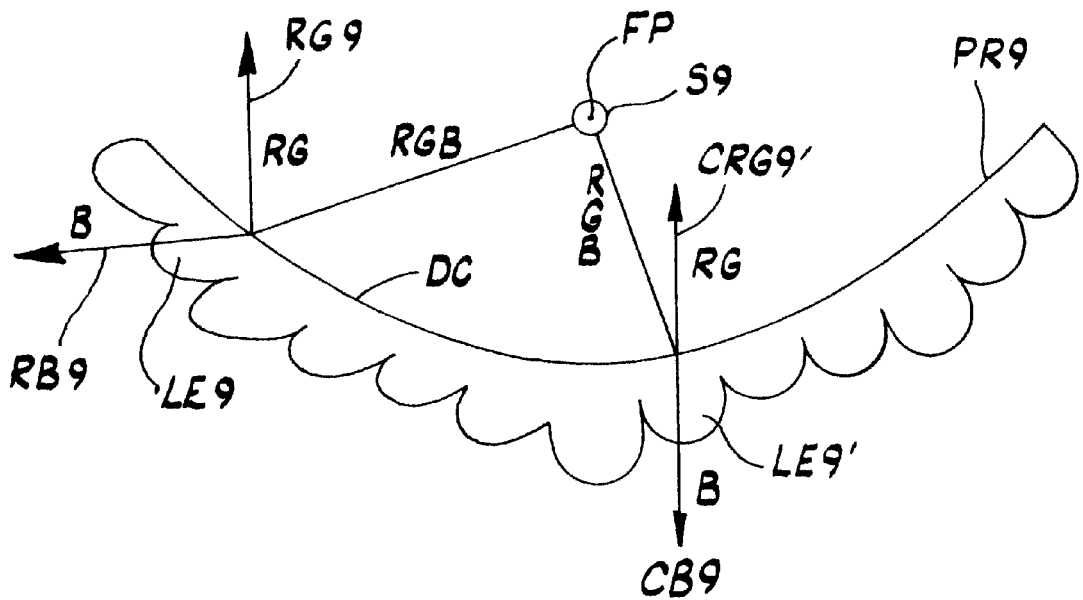
FIGS. 9A, 9B and 9C are schematic diagrams of a parabolic reflector in combination with a dichroic element having integral optical elements.
Figure 9A:
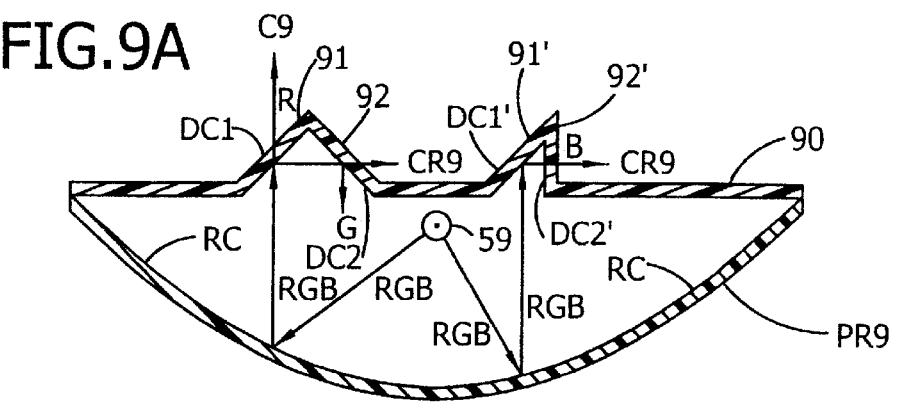
Figure 9B:
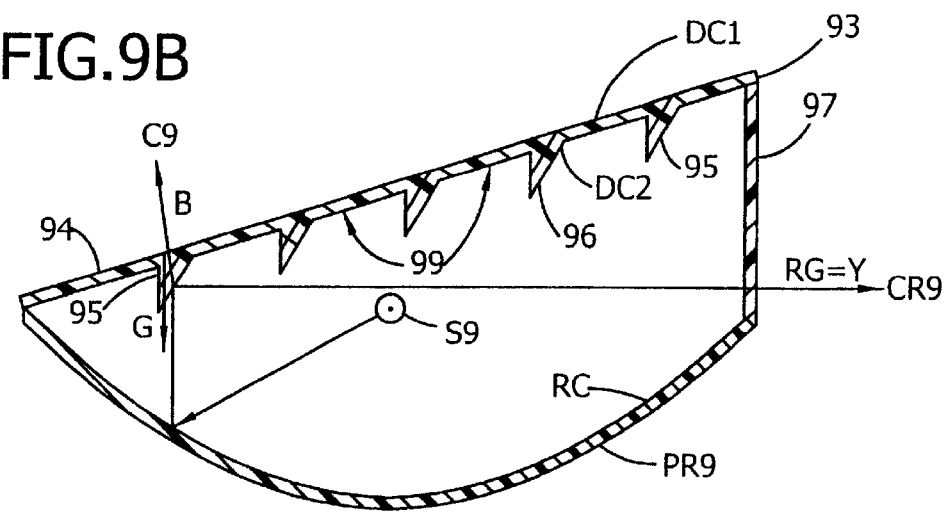

FIGS. 9A and 9B illustrate an embodiment of the invention wherein the dichroic element has a first surface having a first dichroic coating thereon and also has a second surface which is not parallel to the first surface, the second surface having a second dichroic coating thereon. In particular, the dichroic element 90 of FIG. 9A is positioned to intersect the collimated beam of light generated by the parabolic or other beam forming reflector PR9 having a light source S9 located at its focal point. Although the element 90 is generally perpendicular to the collimated beam, it includes a first section 91 having a first dichroic coating DC1 thereon and a second section 92 which is approximately perpendicular to the first section 91 and has a second coating DC2 thereon. Sections 91 and 92 are at an approximate 45° angle with respect to the collimated beam. Assuming that the first coating DC1 is a red dichroic coating and the second coating DC2 is a blue dichroic coating, the following light signals are generated. Collimated light rays passing through the first section 91 generate a beam of collimated rays C9 of red light. The green and blue components of these rays are reflected by coating DC1 toward section 92 which transmits reflected collimated rays CR9 of blue light and which reflects the green components of the light rays back toward the parabolic reflector PR9.

Alternatively, as shown on the right side of FIG. 9A, the second section 92' having a dichroic coating DC1' may be oriented parallel to the collimated beam and forming a 45° angle with first section 91' having a dichroic coating DC1' so that the rays CR9 are substantially perpendicular to the second dichroic coating DC2' thereby minimizing the angle of incidence. In general, either sections 91, 92 or 91', 92' would be employed. Both sets of sections are shown in FIG. 9A for convenience. Multiple sections of either set may be used as long as they do not block each other.

In the embodiment illustrated in FIG. 9B, a dichroic element 93 is positioned at an angle with respect to the collimated beam generated by the parabolic reflector PR9, an outer surface 94 of the element 93 constitutes the first surface having a first dichroic coating DC1 thereon. An inner surface of the element 93 has projections 95 forming a surface 96 which is at an approximate 45° angle with respect to the collimated beam and which has a second dichroic coating DC2 thereon. As illustrated in cross-sectional view in FIG. 9B, the projections 95 have a triangular cross-section. Assuming that coating DC1 is a blue dichroic coating and that coating DC2 is a blue dichroic coating, blue collimated light is transmitted through the element 93 to create blue collimated rays C9 whereas red components and green components are reflected by projections 95 to create a collimated beam of yellow light directed to the right of FIG. 9B and formed by collimated yellow rays CR9. If coating DC1 is a blue coating, it reflects green components so that it may be desirable to employ an optional red absorptive filter 97 to absorb the green components. If coating DC2 is a blue/green dichroic coating, it transmits green components so that they are reflected by the blue dichroic coating DC1.

For simplicity in both FIGS. 9A and 9B, the various structures illustrated therein have not been shown contiguous to each other. For example, in FIG. 9A sections 91, 92 are not contiguous with sections 91', 92' but is joined by a flat surface therebetween. This surface may be separately coated by a similar or different dichroic coating. Alternatively, element 90 may be constructed so that section 92 is contiguous to surface 91' and the angles adjusted so that rays CR9 from section 92 are not blocked by section 91', 92'. Similarly, the projections 95 of FIG. 9B have not been shown contiguous to each other but such projections may be so constructed as part of the element 93. Alternatively, the flat portions between the non-contiguous elements 95 may carry a similar or different dichroic coating thereon.

Alternatively, dichroic coatings DC1 and DC2 may be the same coating. In this embodiment, the varying angle of incidence of light C9 would result in the various sections reflecting and transmitting different colors. Also, in FIG. 9B, coating DC1 is optional and may be eliminated and coating DC2 may cover the entire underside of element 93. In this embodiment, the varying angles of incidence of light C9 would result in the elements 95, 96 reflecting and transmitting different colors than the colors reflected and transmitted by the flat sections 99 between the elements 95, 96.

In FIG. 9C, another alternative is illustrated in which the reflector PR9 is provided with lens elements LE9 for redirecting the transmitted or reflected light. For example, assume the coating DC is a blue dichroic coating. Light source S9 emits diverging light rays R9 which are transmitted as blue light rays RB9 and which are reflected as RG9. Usually, the transmitted rays RB9 are transmitted normal to the incident surface. As shown in FIG. 9C, ray RB9 is directed upward by element LE9 to further disperse the blue transmitted light. Alternatively, elements LE9' may be employed to transmit rays CB9' as collimated rather than diverging light to create a beam of transmitted blue light. Although the lens elements are shown as an integral part of reflector PR9 located on the convex surface which does not have the dichroic coating DC, the following alternatives are contemplated: the elements LE9 and LE9' may be separate elements rather than integral; the elements LE9 and LE9' may have dichroic coating thereon; the elements LE9 and LE9' may have varying sizes, spaces and/or orientations; the elements LE9 and LE9' may be on the concave surface of the reflector; and the reflector may be flat or curved. In one embodiment, reflector PR9 may be made of an absorptive filter material having a dichroic coating DC on its concave surface so that the absorptive filter "cleans up" the transmitted signal to create a particular color.

Figure 10:
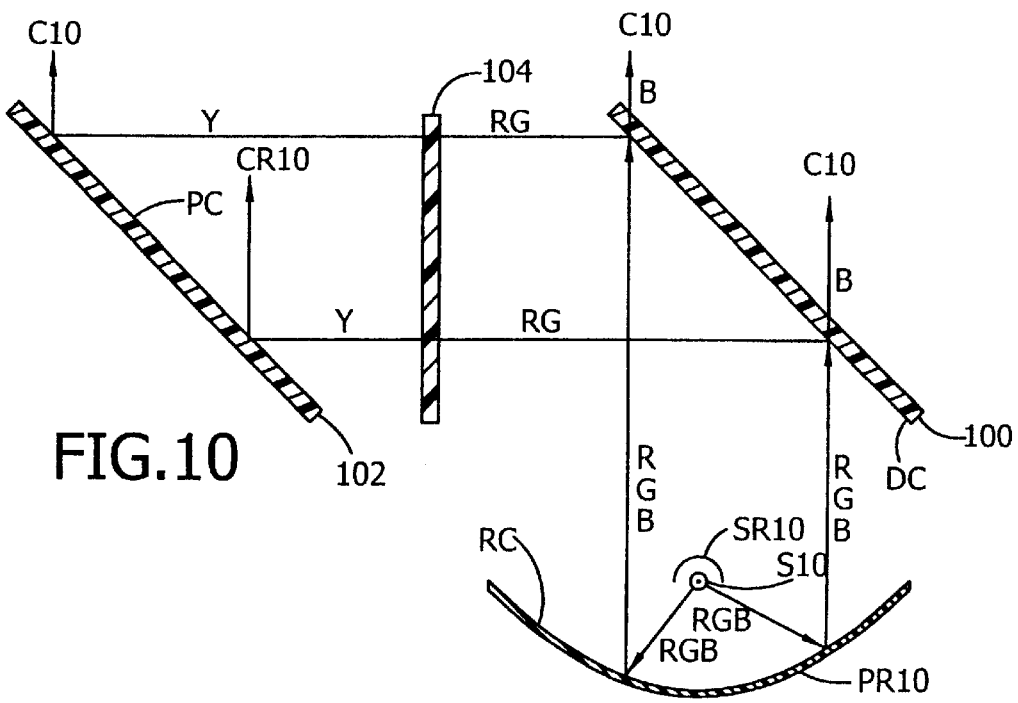
FIG. 10 is a schematic diagram of a parabolic reflector in combination with a dichroic element, an absorptive filter and a mirror.

FIG. 10 is a schematic diagram of a parabolic or other beam forming reflector PR10 having a light source S10 at its focal point in combination with a dichroic element 100 and a mirror 102. As with some of the previous embodiments discussed above, a shield reflector SR10 has been positioned to reflect any radially radiating light rays so that the discussion with regard to FIG. 10 is primarily directed to collimated light beams generated by the parabolic reflector PR10. However, it is contemplated that reflector SR10 is optional so that diverging light rays from the source S10 may create additional light signals. In general, FIG. 10 illustrates a top view of an arrangement which may be mounted on the surface of a light bar for generating two beams of light in the same direction. The collimated light reflected by a parabolic or other beam forming reflector PR10 is directed toward the dichroic element 100 which is positioned at a 45° angle with respect to the collimated beam. Assuming that the element 100 is a blue dichroic element, it would transmit collimated light rays C10 of blue light creating a first warning signal to an observer remote from the apparatus of FIG. 10. Red and green components of the collimated light would be reflected by the dichroic element 100 toward the flat mirror 102 which in turn reflects the red and green components in a direction parallel to the collimated beam passing through the dichroic element 100. The red and green components reflected by the mirror 102 create a second yellow warning signal CR10 of collimated light when viewed by an observer remote from the apparatus of FIG. 10. Optionally, a red absorptive filter 104 may be located between the dichroic element 100 and the flat mirror 102 for absorptive filtering of the reflected collimated light from the dichroic element 100 so that only the red components of the collimated beam are reflected by mirror 102 and so that the green components are absorbed by absorptive filter 104. In this configuration the mirror 102 is parallel to the dichroic element 100 so that the blue and yellow signals of collimated beams are directed in the same direction parallel to each other.

Figure 11A:
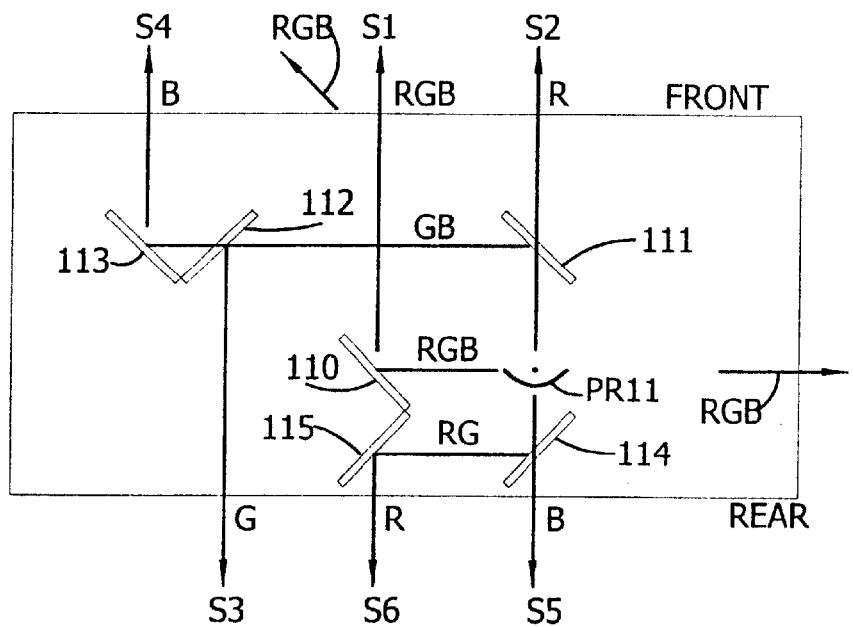
FIGS. 11A and 11B are schematic diagrams of a parabolic reflector in combination with dichroic elements and mirrors or absorptive filters on a light bar.

Alternatively, the mirror 102 may be positioned perpendicular to the dichroic element 100 so that the first and second signals are collimated beams directed in opposite directions parallel to each other (see FIG. 11A). Also, in the embodiment as shown in FIG. 10, the absorptive filter 104 may be replaced by an absorptive filtering mirror (not shown) which only reflects light of a certain color and absorbs generally all other light.

Figure 11B:
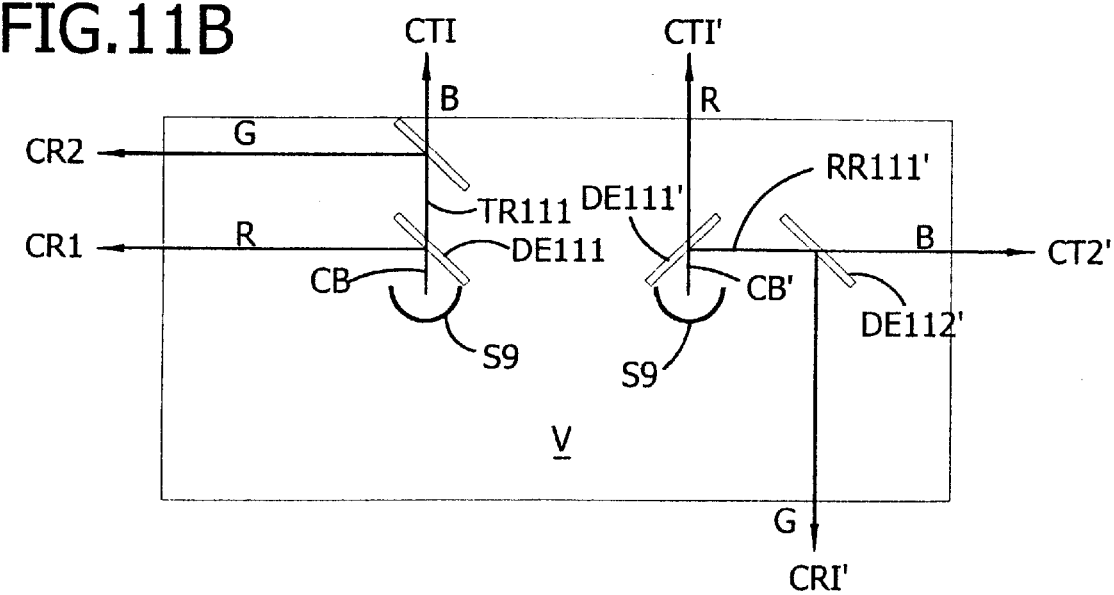

FIGS. 11A, 11B and 11C are top views in schematic form of other light bar configurations in which a rotating parabolic or other beam forming reflector is mounted on a light bar surface in combination with dichroic elements and mirrors or absorptive filters. In FIG. 11A, rotating parabolic or other beam forming reflector PR11 creates six light signals having four different colors. Signal S1 is a forward going, unfiltered beam reflected off a mirror 110 having generally all three R, G, B components (sometimes referred to as white light). Signal S2 is a forward going beam transmitted through a dichroic element 111 and having a color corresponding to the color or wavelength range which is transmitted by the dichroic element 111 (e.g., red). Signal S3 is a rearward going beam created by the light reflected from dichroic element 111 and the light reflected by a dichroic element 112. The color of signal S3 depends upon the common wavelengths which are reflected by both dichroic elements 111 and 112 (e.g., green). For example, if dichroic element 111 is a red dichroic element, it would reflect green and blue components. If dichroic element 112 is a blue dichroic element it would reflect green and red components. Since only green and blue components are provided to dichroic element 112, the signal S3 would be primarily green. Signal S4 is a forward going signal created from the light reflected by dichroic element 111, transmitted by dichroic element 112 and reflected by mirror 113. Assuming dichroic element 112 is a blue dichroic element in the example given above, signal S4 would be a blue signal. It is also contemplated that mirror 113 may be an absorptive filtering mirror to provide certain blue components or other components of light which reach the mirror to enhance the color of the S4 signal.

As parabolic reflector PR11 continues to rotate, its beam is directed toward a dichroic element 114 which transmits light of a particular wavelength (e.g., blue) to create a rearward going signal S5. The light reflected by dichroic element 114 (e.g., red and green) strikes mirror 115 and is reflected to create another rearward going signal S6. The color of signal S5 depends on the transmitivity of dichroic element 114 and the color of signal S6 depends on the reflectivity of dichroic element 114. It is also contemplated that mirror 115 may be an absorptive filtering mirror to filter the light reflected by the mirror 115 to create a particular color. For example, if dichroic element 114 is a blue dichroic element and reflects red and green components, mirror 115 could be a red absorptive filtering mirror so that signal S6 is a red signal and the green components are absorbed. FIG. 11A has been described with regard to the primary signals of collimated light which would be generated in the forward and rearward directions. As noted above, additional light signals may be generated by the apparatus of FIG. 11A. For example, a beam of visible light is generated by the parabolic or other beam forming reflector 111 when it is not striking any of the dichroic elements or mirrors so that as the parabolic reflector 111 rotates, a visible beam W will appear to the side and between the various elements on the bar. In addition, it is contemplated that the parabolic reflector 111 may be a dichroic element itself and transmit certain wavelengths which would create a radially diverging signal in a direction opposite to the direction of the collimated beam (see FIGS. 3 and 8).

FIG. 11B illustrates other examples of top views of light bar configurations including rotating parabolic light sources and including dichroic elements. The left side of FIG. 11B shows two dichroic elements producing three signals: one transmitted signal and two reflected signals. A first dichroic element DE111 is adapted to be mounted on a vehicle V and adjacent to a visible light source S9 producing a beam CB to transmit at least some of the visible light generated by the light source as ray TR111. Element DE111 also reflects at least some of the visible light beam CB generated by the light source to create a first warning light signal CR1 within a first wavelength range(R) when viewed by an observer remote from the vehicle. A second dichroic element DE112 adapted to be mounted on the vehicle V and adjacent to the visible light source S9 transmits at least some of the visible light ray TR111 transmitted by the first dichroic element DE111 to provide a second warning signal CT1 within a second wavelength range (B) different than the first wavelength range (R) when viewed by an observer remote from the vehicle. The second dichroic element DE112 reflects at least some of the visible light rays TR111 transmitted by the first dichroic element DE111 to provide a third warning signal CR2 within a third wavelength range (G) different than the first and second wavelength ranges (R, B) when viewed by an observer remote from the vehicle. As a result, signals CR1 and CR2 are created by reflection by a dichroic element and signal CT1 is created by transmission by a dichroic element.

The right side of FIG. 11B shows two dichroic elements producing three signals: two transmitted signals and one reflected signal. A first dichroic element DE111' is adapted to be mounted on a vehicle V and adjacent to a visible light source S9' producing a beam CB' to transmit at least some of the visible light generated by the light source as ray TR111' to create a first warning light signal CT1' within a first wavelength range(R) when viewed by an observer remote from the vehicle. Element DE111' also reflects at least some of the visible light beam CB' generated by the light source as ray RR111'. A second dichroic element DE112' adapted to be mounted on the vehicle V and adjacent to the visible light source S9' transmits at least some of the visible light ray RR111' transmitted by the first dichroic element DE111' to provide a second warning signal CT2' within a second wavelength range (B) different than the first wavelength range (R) when viewed by an observer remote from the vehicle. The second dichroic element DE112' reflects at least some of the visible light rays RR111'; transmitted by the first dichroic element DE111' to provide a third warning signal CR1' within a third wavelength range (G) different than the first and second wavelength ranges (R, B) when viewed by an observer remote from the vehicle. As a result, signals CT1' and CT2' are created by transmission by a dichroic element and signal CR1' is created by reflection by a dichroic element.

Figure 12A:
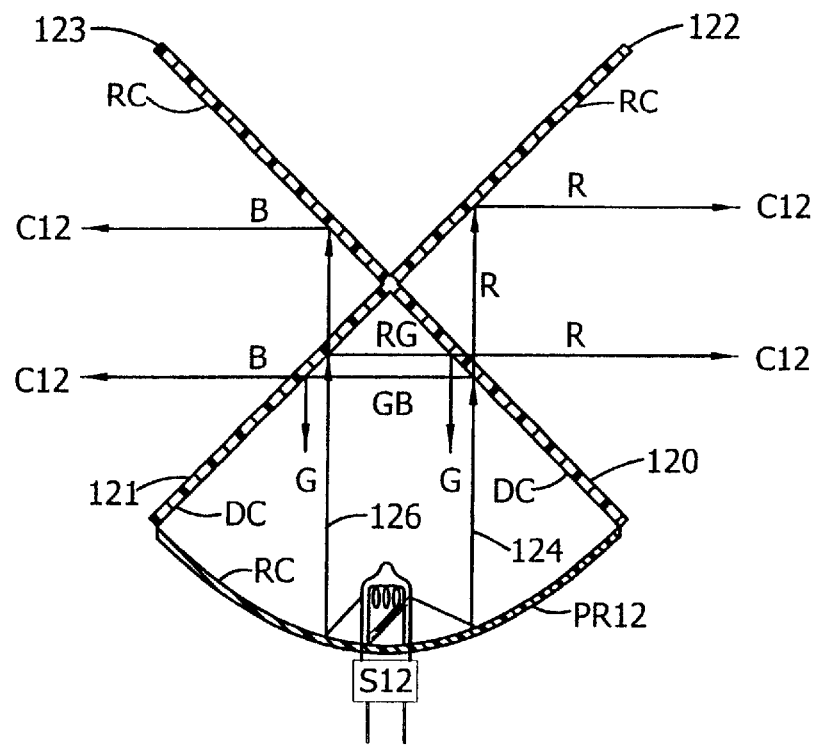
FIGS. 12A–12D are schematic diagrams of a parabolic reflector in combination with dichroic elements and mirrors in an X pattern.
Figure 12B:
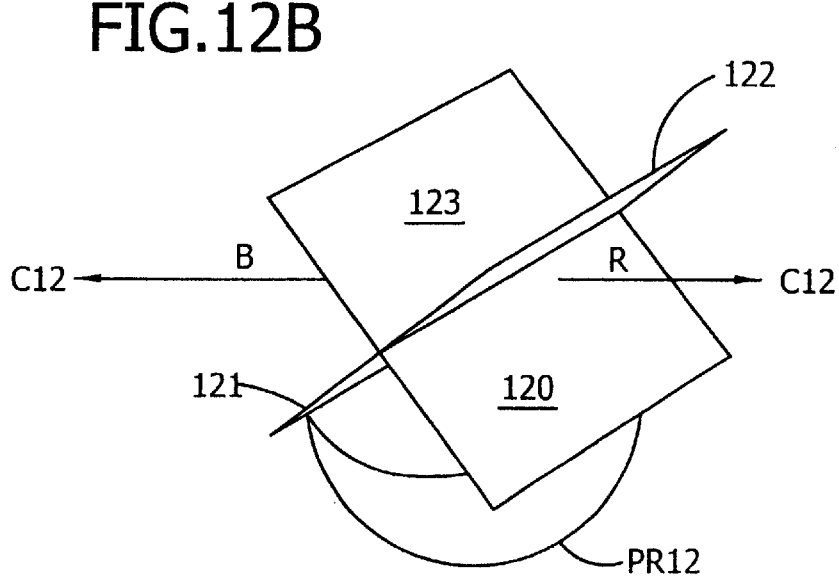

FIG. 12A is a side view and FIG. 12B is a perspective view of a vertically upwardly aimed parabolic or other beam forming reflector in combination with dichroic elements and mirrors in an "X" pattern. In particular, parabolic or other beam forming reflector PR12 is positioned such that light source S12 is located at its focal point (FIG. 12A is not to scale) and generates a beam of collimated light which is aimed substantially vertically upward. Dichroic elements 120 and 121 are positioned over the parabolic reflector PR12 in a manner similar to the apparatus illustrated in FIG. 7. In addition, a mirror 122 is positioned over the dichroic element 120 and coplanar with the dichroic element 121. Similarly, a mirror 123 is positioned over the dichroic element 121 and is coplanar with the dichroic element 120. As a result, the dichroic elements 120 and 121 each are positioned to intersect at least a portion of the beam of light generated by the parabolic reflector PR12 and the mirrors 122 and 123 are each positioned to reflect the light transmitted by the first and second dichroic elements 120 and 121, respectively. As a result, the mirrors 122 and 123 and the dichroic elements 120 and 121 direct two collimated beam of light in a direction which is substantially horizontal and away from each other. For example, assume dichroic element 120 is a red dichroic element and dichroic element 121 is a blue dichroic element. Collimated light ray 124 of visible light generates a red component which is transmitted by red dichroic element 120 and reflected horizontally by mirror 122 to create collimated rays C12 forming a red light beam. Dichroic element 120 reflects the green and blue components of ray 124 in a direction horizontal to the left and toward dichroic element 121 which transmits the blue components to form a collimated rays CR12 forming a blue light beam. Dichroic element 121 reflects the green components of the components reflected by dichroic element 120 from light ray 124 in a downward direction. Similarly, visible light ray 126 generates a blue component which is transmitted by blue dichroic element 121 and reflected horizontally by mirror 123 to create collimated blue light rays C12 forming a blue light beam. The red and green components are reflected by dichroic element 121 horizontally to the right. The red components are transmitted by dichroic element 120 to create collimated red rays CR12 forming a red light beam. The green components are reflected downward by dichroic element 120. As noted above with regard to FIG. 7, radially diverging light rays 127 emitted directly by the light source S12 also create a diverging warning light signal of red light which is transmitted horizontally to the right and of blue light which is transmitted horizontally to the left. This diverging light is not illustrated in FIG. 12A. If this apparatus is rotated, which is contemplated, then an observer would see two signals of different colors. Although elements 122 and 123 are shown as plastic substrates, they may be any reflective material (e.g., metal) and may be tinted to absorb undesirable wavelengths.

Figure 12C:
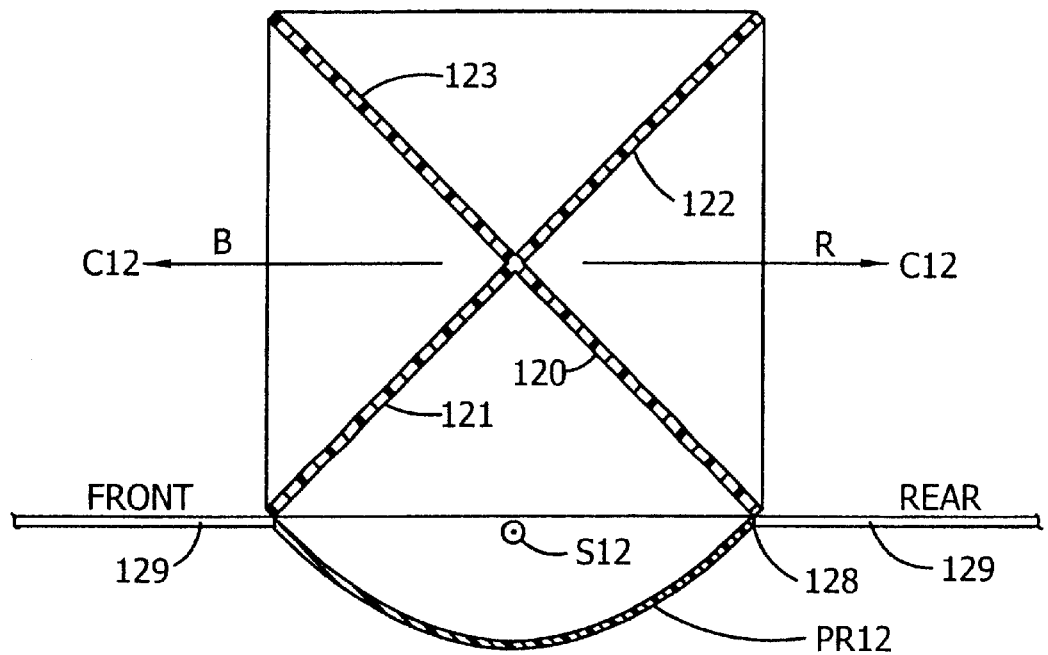
Figure 12D:
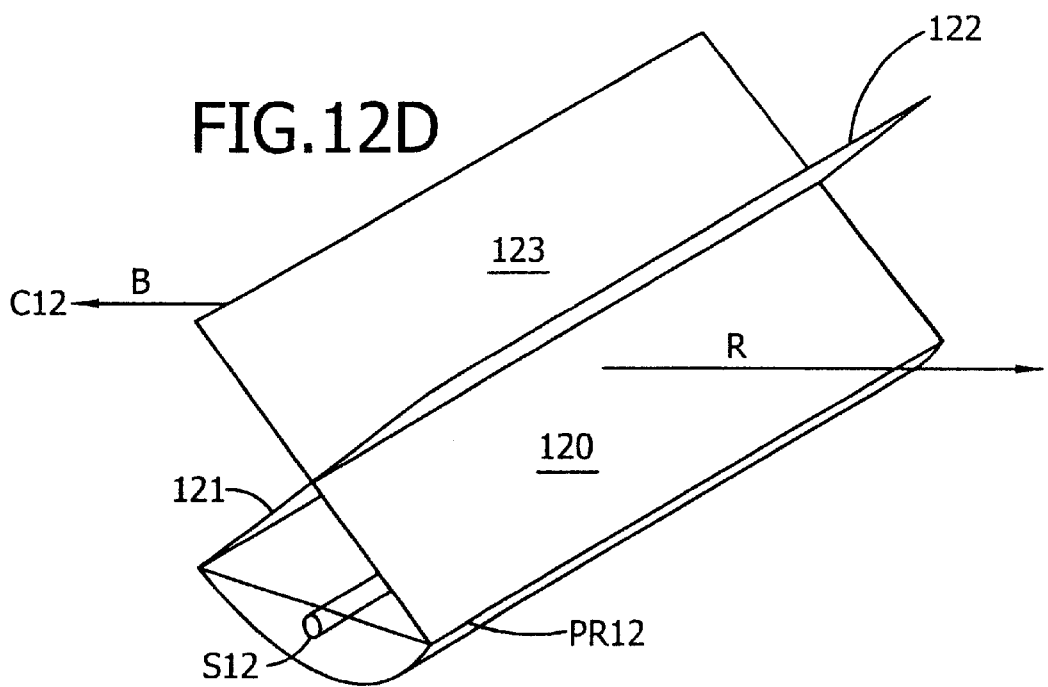

FIGS. 12C and 12D illustrate a trough configuration for the parabolic reflector PR12 in combination with dichroic elements and mirrors in an X pattern. In FIG. 12C, a side view of the trough configuration mounted in a light bar is illustrated. Parabolic reflector PR12 is positioned within an opening 128 of a substantially horizontal support wall 129 of the light bar. The parabolic reflector PR12 is a trough having an axis which runs parallel to the elongate axis of the light bar so that the signals generated are projected to the front and rear of the light bar. It is also contemplated that the axis may run perpendicular or at an angle to the light bar axis so that the signals are projected to the sides or other locations around the light bar. The parabolic reflector PR12 is set below and substantially flush with the horizontal wall 129 so that the X pattern of dichroic elements 120, 121 and mirrors 122, 123 is above the wall 129. Light source 12 is a strobe tube or other elongated light source which runs along the length of the trough of the parabolic reflector PR12.

Figure 13A:
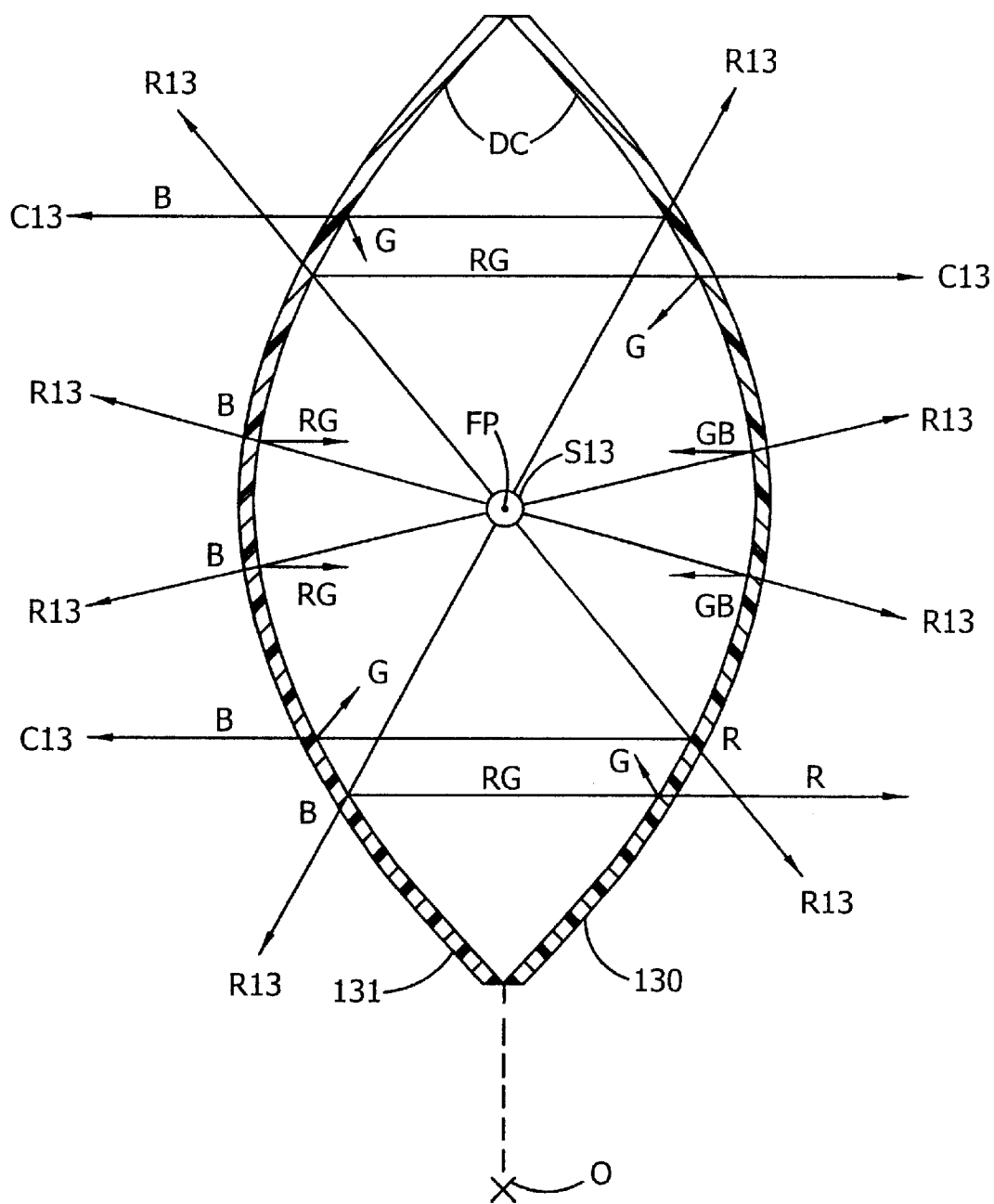

FIG. 13A is a top cross-sectional view of two parabolic or other beam forming dichroic elements in opposed relation to each other such that the elements are in registry with each other and the ends of the elements are contiguous with each other. Preferably, the focal areas (e.g., focal points (FP) of the parabolic or other beam forming reflectors are coincident with each other and coincident with the light source S13. In one preferred embodiment, parabolic or other beam forming reflector 130 is a red dichroic element and parabolic or other beam forming reflector 131 is a blue dichroic element. The apparatus of FIG. 13A creates four signal light patterns. The radial light directly emitted by the light source S13 creates a radially diverging pattern of red light directed to the right in the form of red light rays R13 and a blue pattern of diverging light directed to the left in the form of blue light rays R13. In addition, the light reflected by parabolic reflectors 130 and 131 include two beams of collimated light. To the right, a beam of collimated red light is created by red light rays C13 and, to the left, a beam of collimated blue light is created by blue light rays C13. If the apparatus of FIG. 13A is rotated about the focal point, which is contemplated, six warning light signals would be apparent to an observer O positioned to the south of the apparatus. In particular, if the apparatus is rotated clockwise, an observer O would first see a diverging pattern of red light rays R13 followed by a collimated pattern of red light rays C13 followed by a diverging pattern of red light rays R13 followed by a diverging pattern of blue light rays R13 followed by a collimated beam of blue light C13 followed by a diverging pattern of red light rays R13.

Figure 13D:
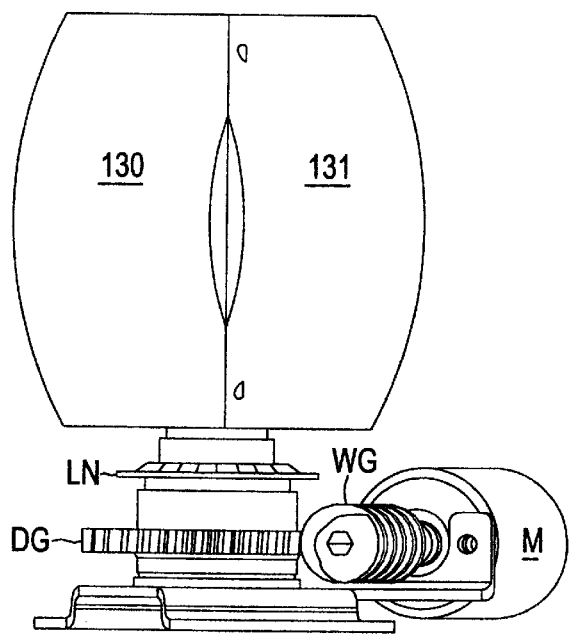

FIG. 13C is a perspective view of a pair of opposing parabolic dichroic elements 130, 131 mounted on a rotator. FIG. 13B is an exploded view of the apparatus of FIG. 13C. A motor M drives a worm gear WG which rotates a drive gear DG. Secured to the drive gear DG is a bracket B carrying the elements 130, 131 and locked to the drive gear DG by a retaining ring RR. The elements 130, 131 may be glued together and have projections P engaging holes H in the bracket B. The drive gear DG rotates about a light S13 which may be provided with an optional coated sleeve 139 described in more detail in FIG. 13H. FIG. 13D is a side view of the apparatus of FIGS. 13B and 13C.

Figure 13E:
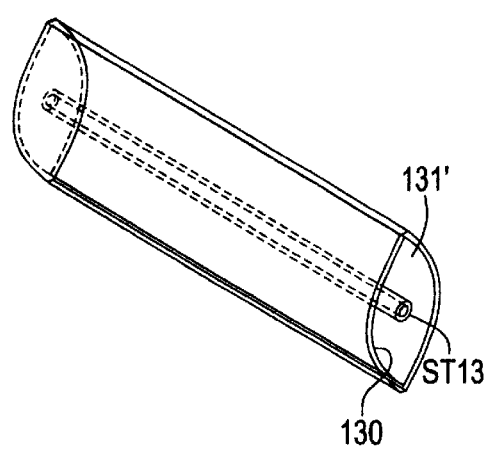
Figure 13F:
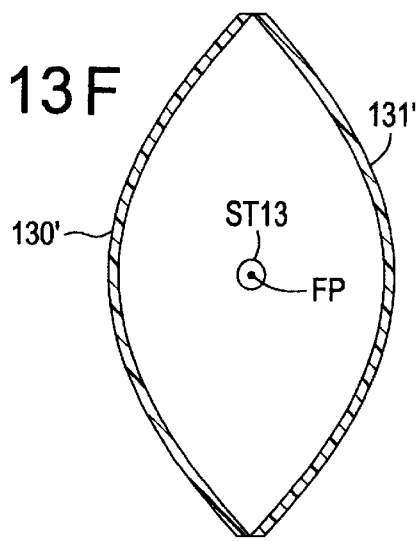
Figure 13G:
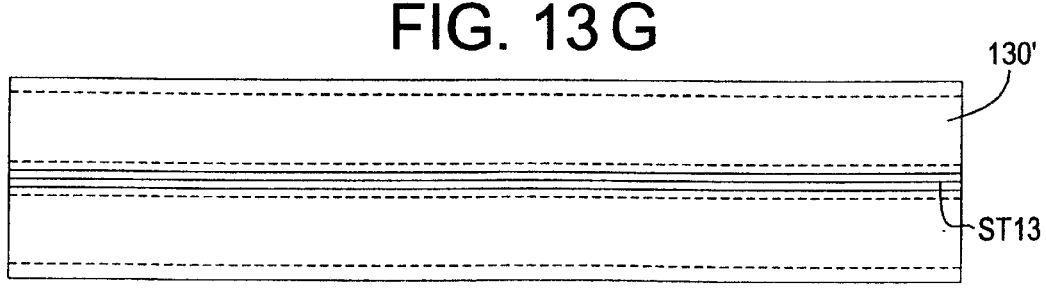

FIGS. 13E, 13F and 13G illustrate perspective, end and top views, respectively, of a pair of opposing parabolic or other beam forming dichroic elements 130', 131' having a strobe tube ST13 or other elongated light source coincident with their coincident focal points FP.

Figure 13H:
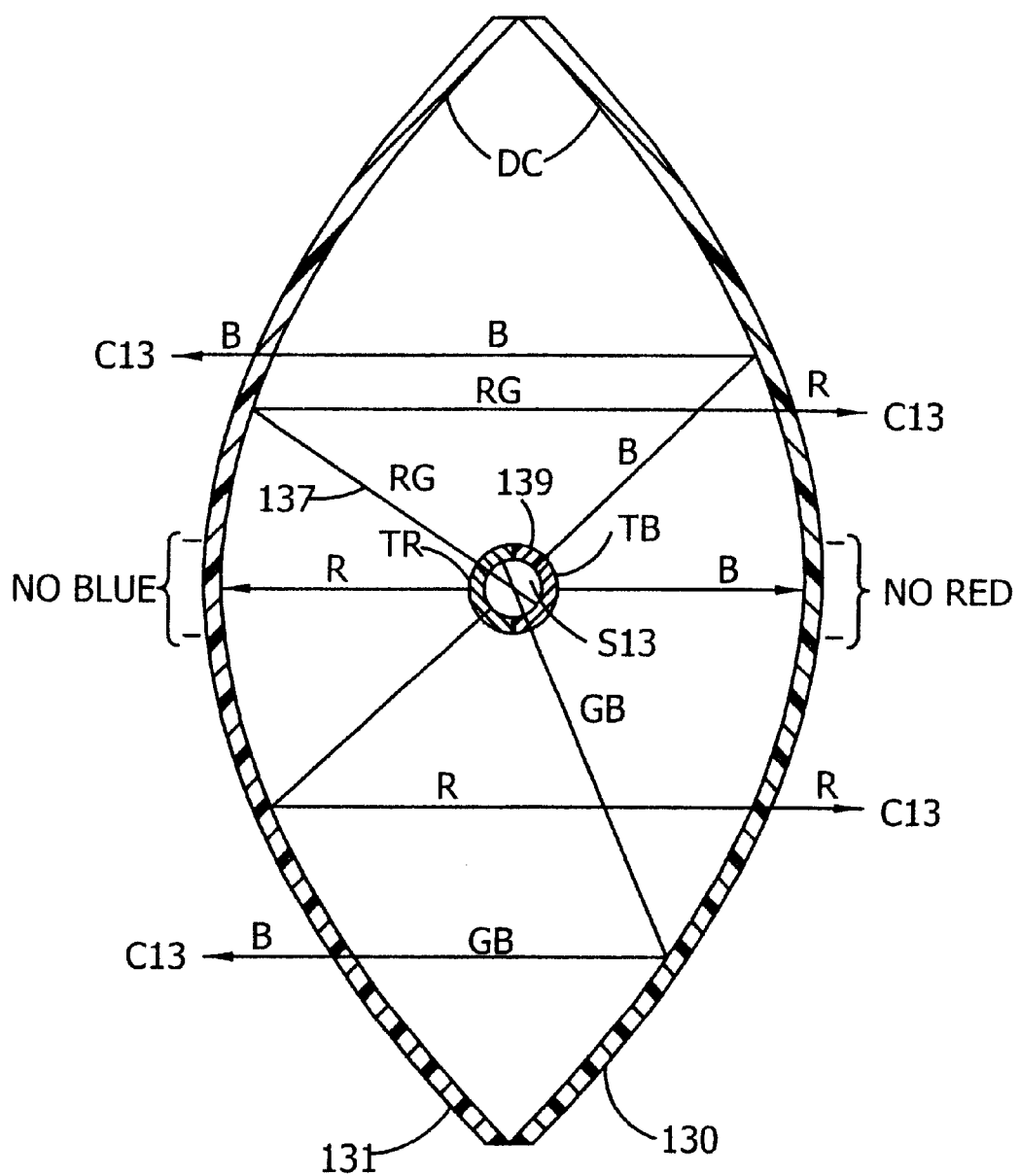

As shown in FIG. 13H, light source S13 may be provided with a coated sleeve 139 (or source S13 may be coated directly with a dichroic coating). The sleeve at least partially surrounds the light source and has a first portion reflecting light toward the beam forming reflectors 130, 131. In particular, the sleeve 139 has a dichroic coating TB for transmitting only blue light toward its right side and a dichroic coating TR for transmitting only red light toward its left side. Substantially all other light would be reflected. As a result, the coated sleeve would convert the radially diverging light into collimated light. In particular, red and green components are reflected by coating TB to create rays 137 which add to the red collimated light C13 to the right. Also, green and blue components are reflected by the coating TR to create rays 138 which add to the blue collimated light C13 to the left. One result of the sleeve 139 is that no red light is transmitted to the right in the region in which coating TB is located and no blue light is transmitted to the left in the region in which coating TR is located, as noted in FIG. 13H. Alternatively, sleeve 139 may be implemented by a coating on the light source S13 wherein the coating has a first portion reflecting light toward the beam forming reflector so that the coating includes a reflective portion which functions similarly to the shield reflectors noted above with regard to FIGS. 7, 8, 8A and 10.

FIGS. 14A–14E illustrate another preferred embodiment of the invention in the form of three parabolic or other beam forming dichroic elements contiguous with each other. The elements are configured so that the focal points are coincident with each other and coincident with the light source and are joined end-to-end to create a triangular structure when viewed from the top. In this configuration it is also contemplated that each of the three parabolic or other beam forming reflected elements 140, 141 and 142 would transmit a different component color or wavelength range of light. For example, reflector 140 would transmit red components and reflect blue and green components, reflector 141 would transmit blue components and reflect green and red components and reflector 142 would transmit green components and reflect red and blue components.

Figure 14A:
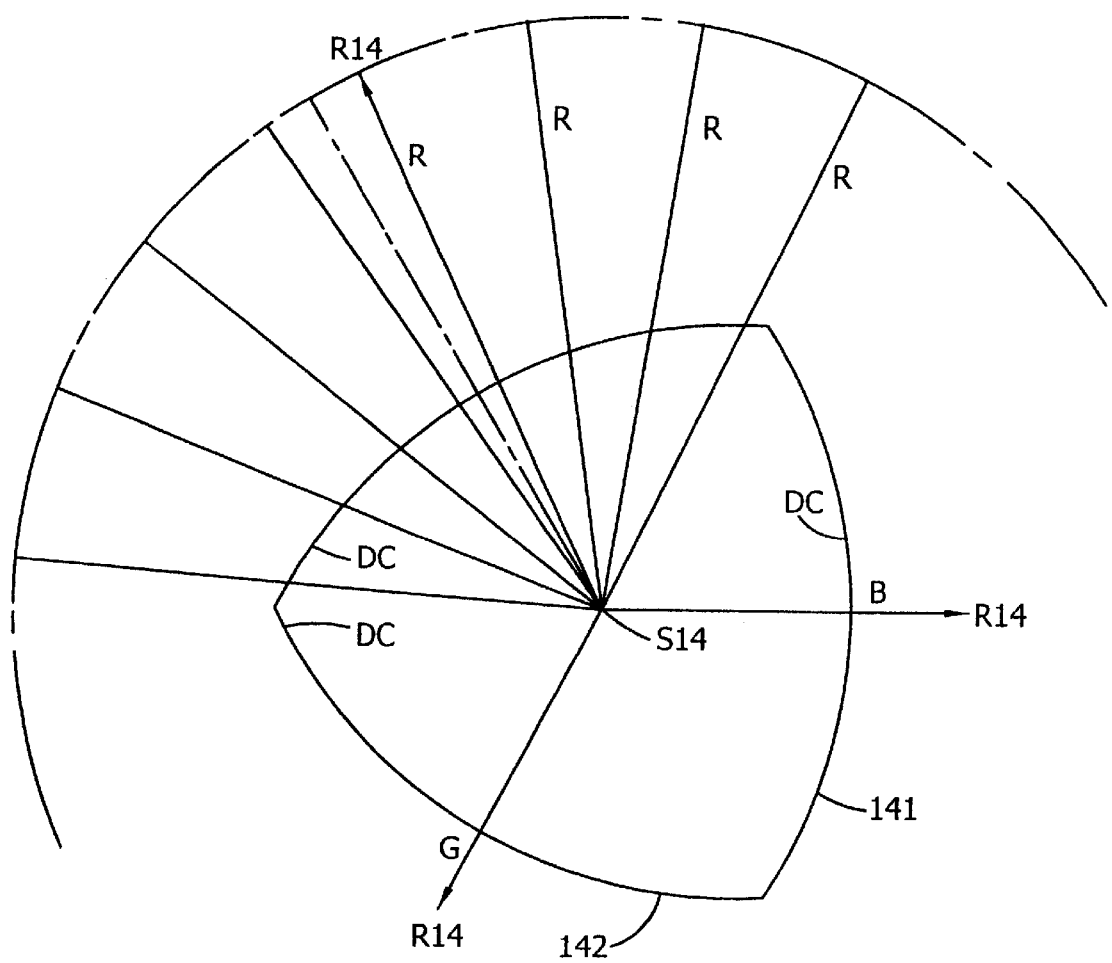

There are several paths of the light generated by the reflectors of FIGS. 14A–14E. For simplicity, only some of the paths are illustrated. In FIG. 14A, an illustration of the radial light directly emitted by the light source S14 and transmitted by the three dichroic reflectors 140, 141 and 142 is illustrated. In particular, element 140 transmits red radial light in the form of diverging red light rays R14, parabolic or other beam forming dichroic element 141 transmit blue radial light in the form of diverging blue light rays R14 and parabolic or other beam forming dichroic element 142 transmits green light in the form of diverging green light rays R14. FIG. 14B illustrates the light reflected by the reflectors 140, 141 and 142. Reflector 140 reflects green and blue components to create a beam of blue collimated light rays C14 transmitted through reflector 141 and to create a beam of green collimated light transmitted through reflector 142. Reflector 141 reflects red and green components to create a beam of red collimated light rays C14 which is transmitted through reflector 140 and a beam of green collimated light which is transmitted through reflector 142. Reflector 142 reflects red and blue components to create a beam of red collimated light rays C14 transmitted through reflector 140 and a beam of blue collimated light transmitted through reflector 141.

Figure 14C:
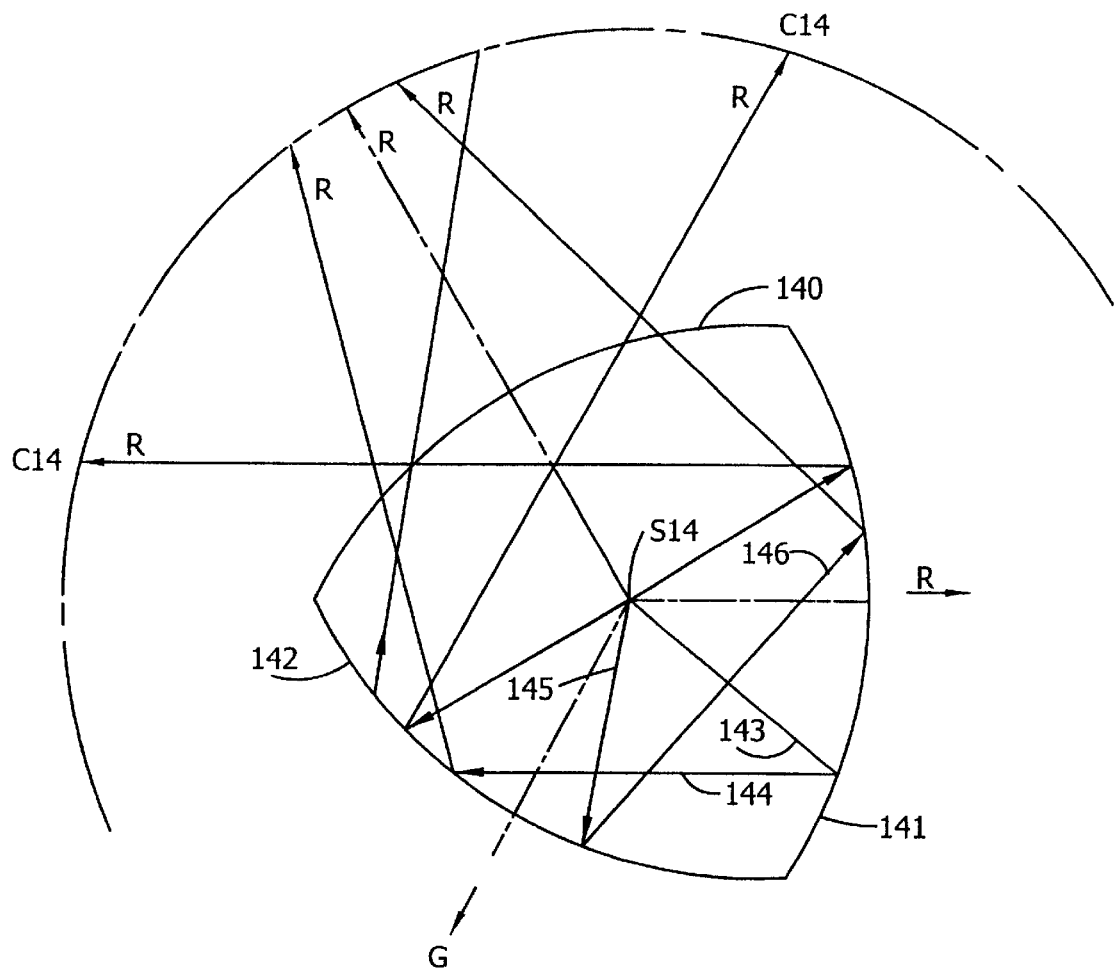

FIG. 14C illustrates the light rays which pass through reflector 140. These rays fall into three different categories. First, the radially diverging rays R14 as illustrated in FIG. 14A pass through reflector 140 originate directly from the light source S14. Second, collimated light C14 also passes through reflector 140 and originates from radial light emitted by the source S14 and reflected by reflectors 141 and 142. In addition, a third source or path of light is transmitted through reflector 140 in the form of light rays RR14. These are rays that are originally emitted by source 114 and then reflected by reflector 141 and 142 (see rays 143 and 144) or reflected by reflector 142 and 141 (see rays 145 and 146).

Figure 14D:
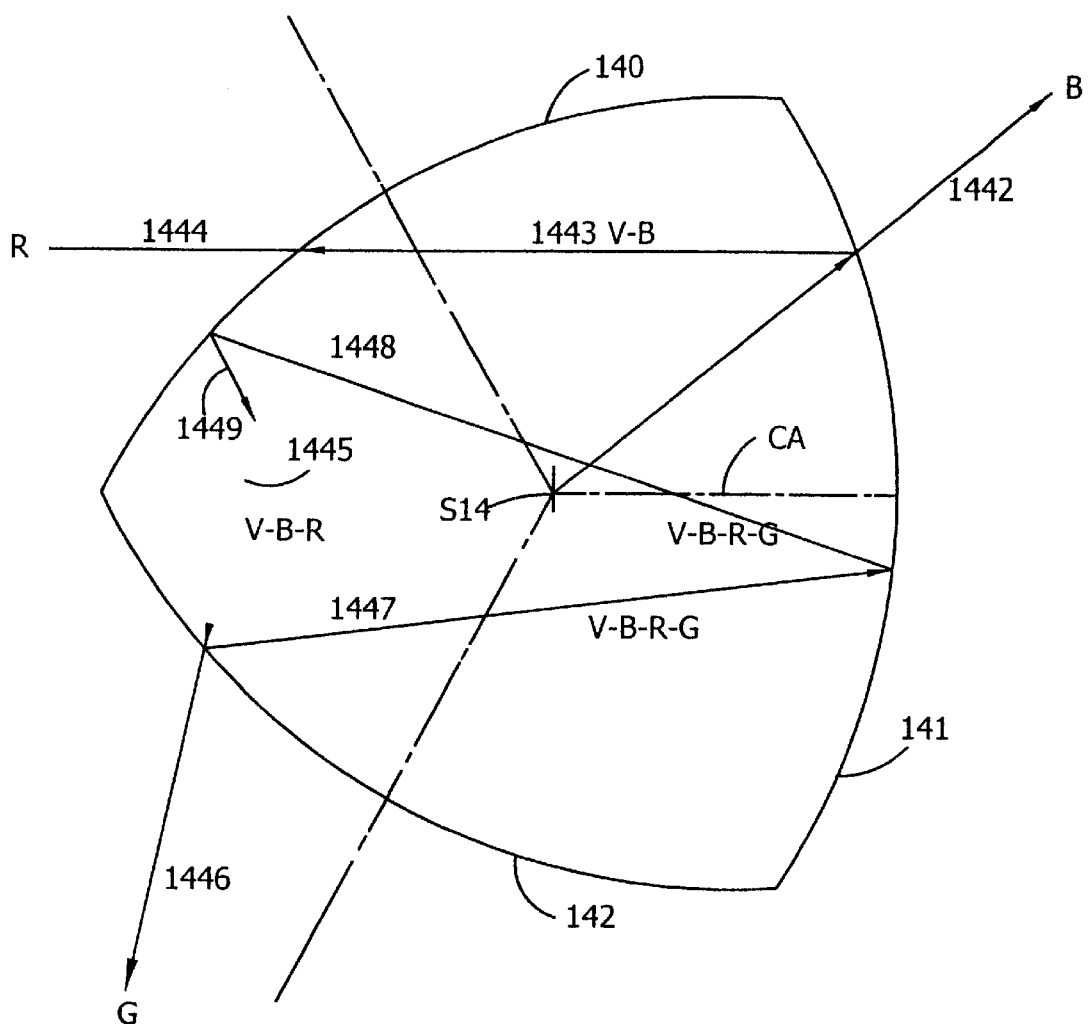

FIG. 14D illustrates the path of one light ray 1441 which originates from source S14. Initially, the ray 1441 has R, G and B components. Some of the B components are transmitted through element 141 to create ray 1442. The remaining components, i.e., the visible components V minus the transmitted components B (V-B), are reflected by element 141 as ray 1443. Some of the R components are transmitted through element 140 to create ray 1444. Rays 1444 form a collimated beam aligned with a central axis CS of element 141. The remaining components V-B-R are reflected by element 140 to create ray 1445. Some of the G components are transmitted through element 142 to create ray 1446. The remaining components V-B-R-G are reflected by element 142 to create ray 1448. This ray 1448 has components which are not transmitted by elements 140, 141 or 142. Although it is possible to select dichroic coatings for the elements 140-2 so that transmitted wavelengths of each element overlap with the other elements, this illustration assumes that not all components are transmitted. As a result, some light continues to reflect within the elements as rays 1448, 1449 and so on until the light is dissipated.

Figure 15A:
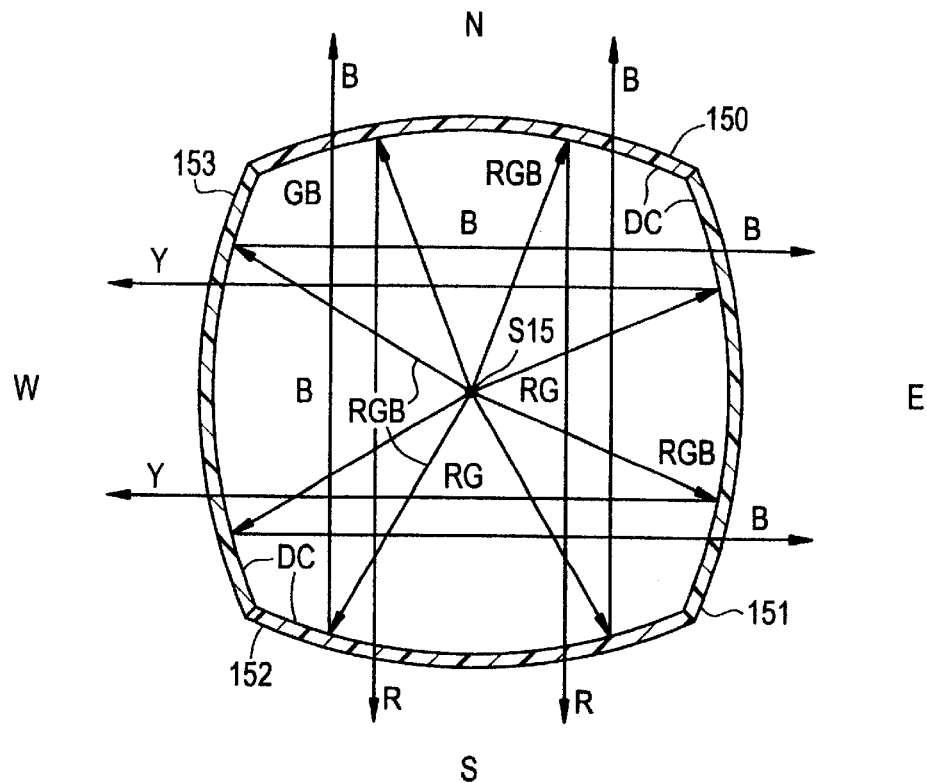
FIGS. 15A–15C are schematic diagrams of two pairs of parabolic reflectors, each pair having opposing reflectors, each reflector having a dichroic coating.
Figure 15B:
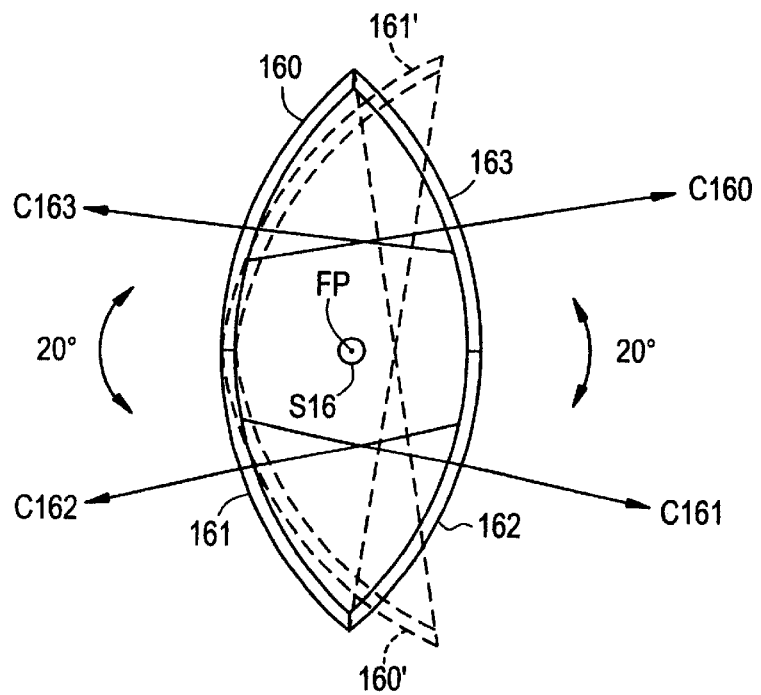
Figure 15C:
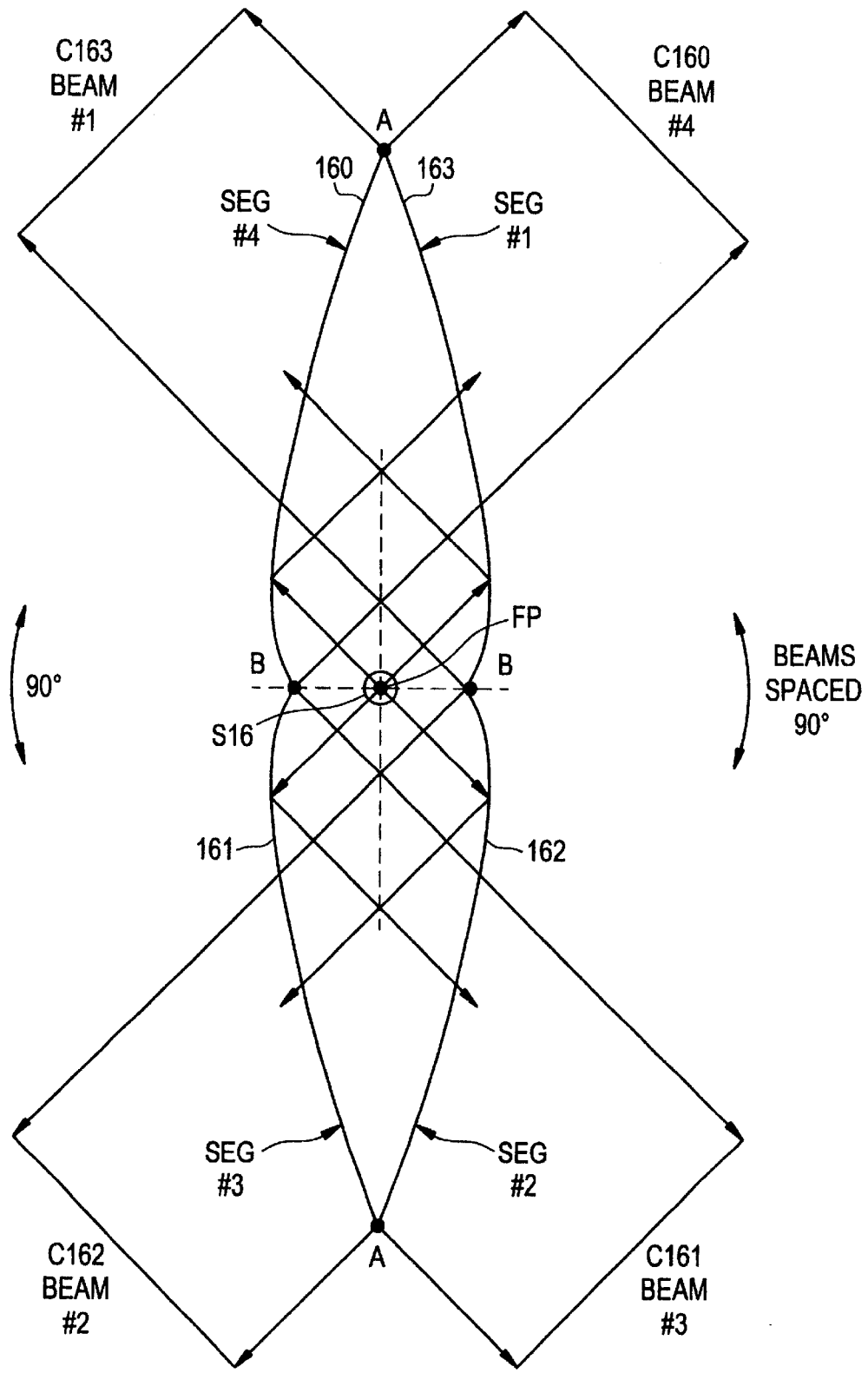

FIGS. 15A–15C illustrate one preferred embodiment of the invention comprising four dichroic parabolic or other beam forming reflectors 150, 151, 152 and 153 joined end-to-end in a parallelogram configuration. The elements are configured so that the focal points are coincident with each other and coincident with the light source and are joined end-to-end to create a rectangular structure when viewed from the top. The square configuration of FIG. 15A produces four signals of diverging light and four beams of collimated light. For example, assume that reflectors 150 and 151 are blue dichroic elements, that reflector 152 in a red dichroic element and that reflector 153 is a yellow (red+ green) dichroic element. Reflectors 150 and 151 would transmit blue light radially directed by the light source S15 to create a signal of blue diverging light to the north and east. Reflector 152 would transmit red light to create diverging signals of red light to the south. Reflector 153 would transmit yellow light to create diverging signals of yellow light to the west. For simplicity, these diverging signals which are generally less desirable than the collimated signals are not illustrated in FIG. 15A. Of more interest is the collimated light generated by the configuration of FIG. 15A. In particular, a beam of collimated blue light would be directed north and result from the light reflected by reflector 152 and transmitted by reflector 150. A beam of blue collimated light would also be directed to the east resulting from the light reflected by reflector 153 and transmitted by reflector 151. A beam of red collimated light would be directed to the south resulting from the light reflected by reflector 150 and transmitted by reflector 152. A beam of yellow collimated light would be directed to the west resulting from the light reflected by reflector 151 and transmitted by reflector 153. Other colors and configurations are contemplated depending on the type of dichroic coating DC applied to each of the parabolic or other beam forming reflectors. If this structure is rotated, which is contemplated, an observer would see two blue beams followed by a red beam followed by a yellow beam (with radial components between the beams).

FIGS. 15B and 15C illustrate other four element configurations. In these figures, only an asymmetric portion of the parabolic or other beam forming element is used. The focal points FP and the light source S16 are coincident. FIGS. 15B and 15C comprise dichroic parabolic or other beam forming elements 160, 161, 162 and 163, each generating collimated beams C160, C161, C162 and C163, respectively. In FIG. 15B, the unused portions of elements 160 and 161 are shown in phantom and referred to by reference characters 160' and 161', respectively. In FIG. 15B, beams C160 and C161 are spaced by about 20 degrees and beams C162 and C163 are spaced by about 20 degrees. In FIG. 15C, different portions of the parabolic or other beam forming elements are used. As a result, beams C160 and C161 are spaced by about 90 degrees and beams C162 and C163 are spaced by about 90 degrees.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense. Other configurations may be possible such as dichroic reflectors which transmit one of the three subtractive or colorant primaries: magenta, yellow, and cyan. For convenience in some figures, the reflectors or other elements are shown as single lines although it is contemplated that any reflector, filter or other element would likely have a thickness such as a transparent or translucent substrate (including an absorptive filter) with a dichroic coating on either side. In addition, any of the above configurations may be a stationary device or a device which is rotated, oscillated or flashed.

Figure 16A:
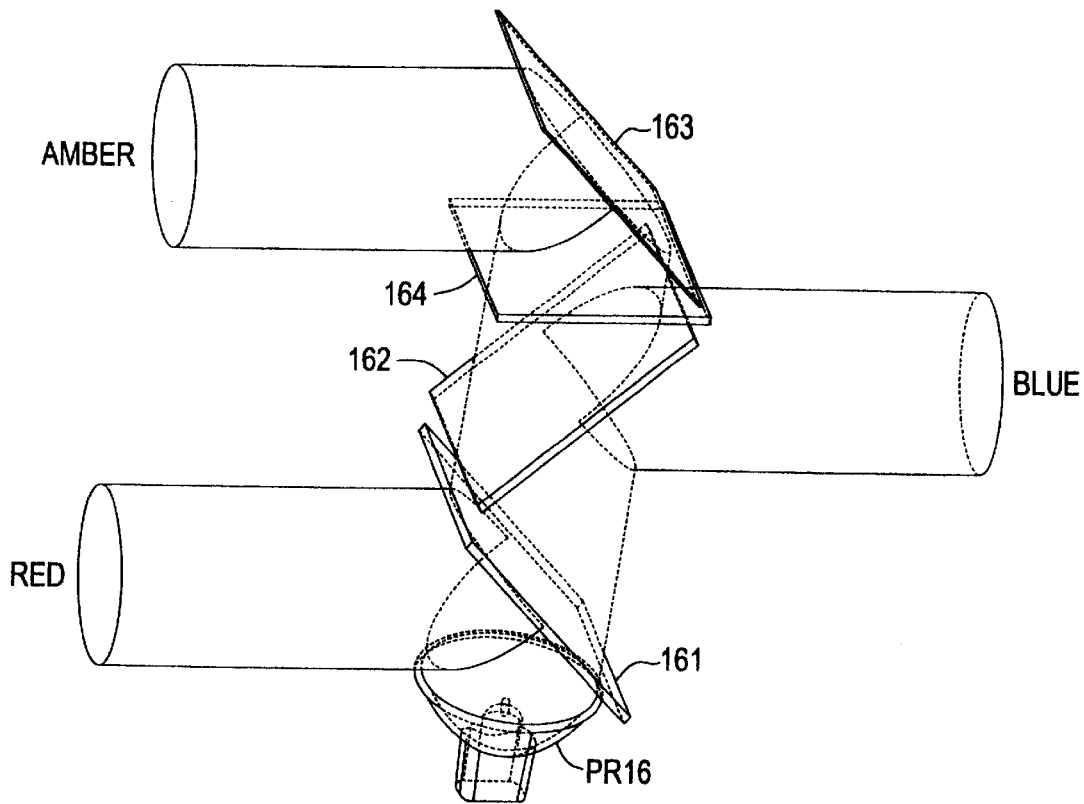
FIGS. 16A and 16B are perspective views of one preferred embodiment of the invention employing the reflective properties of dichroic elements to generate warning signals in opposite directions.
Figure 16B:
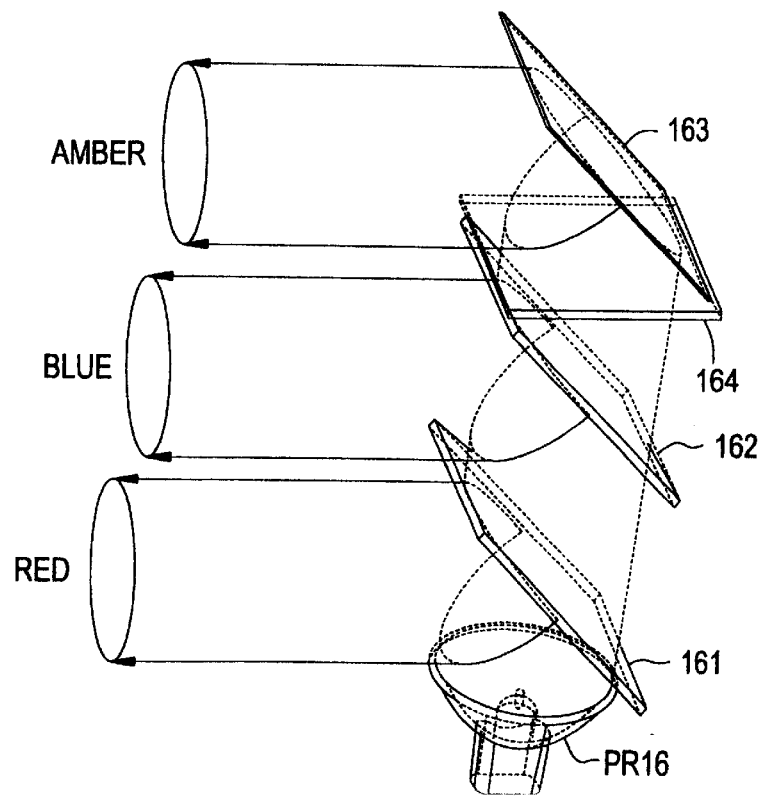
Figure 16C:
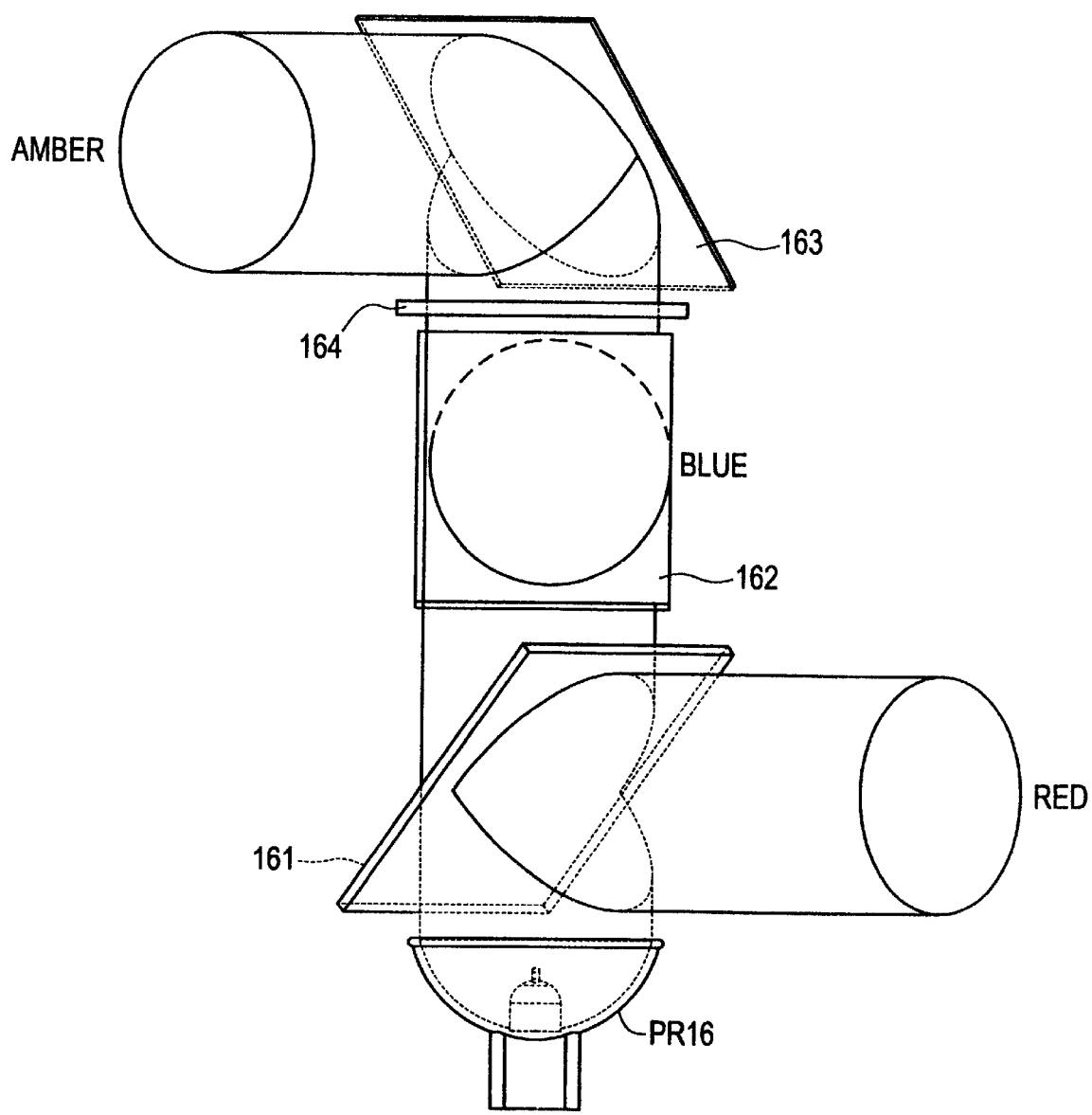
FIG. 16C is a side view of one preferred embodiment of the invention employing the reflective properties of dichroic elements to generate warning signals spaced 120 degrees apart.

Although the discussion above primarily assumes that a dichroic coating DC is chosen to selectively transmit a certain wavelength range of light and to reflect generally all other wavelengths, it is contemplated that a particular element may have a dichroic coating DC chosen to selectively reflect a certain wavelength range of light and to transmit generally all other wavelengths. For example, FIGS. 16A, 16B and 16C illustrate embodiments which employ selective reflection. FIGS. 16A and 16B are perspective views of one preferred embodiment of the invention employing the reflective properties of dichroic elements to generate warning signals in various directions. A reflector PR16 forms a beam which is horizontally aimed at elements 161, 162 and 163. Element 161 includes a dichroic coating selected to reflect some red components to create a red warning signal. Element 161 transmits unreflected red components and the blue and green components to element 162 which has a dichroic coating selected to reflect some of the blue components to create a blue warning signal. Element 162 transmits the unreflected red and blue components and the green components to element 163 which has a dichroic coating selected to reflect some of the red and green components to create an amber warning signal. Element 163 transmits a beam (not shown) of the unreflected red, blue and green components (which may be used as a fourth warning signal, if desired). An optional filter 164 may be positioned between the elements 162 and 163 to absorb light components which are not needed for reflection to create the amber signal or the signal, if any, transmitted by element 163. It is contemplated that the structures illustrated in FIGS. 16A and 16B may be mounted on a horizontal substrate of a light bar for a vehicle, although other configurations will be apparent to those skilled in the art. In FIG. 16A, elements 161 and 163 are oriented to reflect red and amber warning signals to the left, respectively, and element 162 is oriented generally perpendicular to elements 161 and 163 to reflect a blue warning signal to the right. In FIG. 16B, generally all three elements are parallel to each other and reflect red, blue and green warning signals to the left.

Figure 16D:
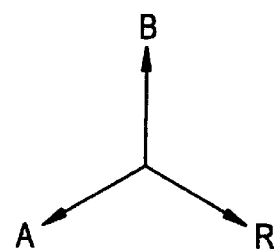
FIG. 16D is a top view of the warning signals produced by the structure of FIG. 16C.

FIG. 16C is a side view of one preferred embodiment of the invention employing the reflective properties of dichroic elements to generate warning signals spaced 120 degrees apart. In this embodiment, reflector PR16 creates a generally vertical beam and reflectors 161-3 are oriented to create three orthogonal beams 120 degrees apart as illustrated in FIG. 16D.

Any of the elements or entire structures of FIGS. 16A–16C may be rotated, oscillated or otherwise moved independent of each other to create a moving warning signal. In particular, it is contemplated that the structure of FIG. 16C may be rotated about a central axis of the beam to create three rotating warning signals. Reflector PR16 need not rotate and only elements 161-3 must be supported on a housing or rack which can rotate. Also, the elements may be counter rotated. For example, element 161 may be rotated clockwise while elements 162 and 163 are rotated counterclockwise. Those skilled in the art will recognize other patterns which may be accomplished with the structures of FIGS. 16A–16C.

It is also recognized that the transmitivity, reflectivity, surface location, surface orientation or angle of application of a coating is adjustable to vary the optical effect.

What is claimed is:

1. A light for a vehicle comprising:
   a visible light source adapted to be mounted on the vehicle for generating visible light creating warning signals which are viewed by observers remote from the vehicle;
   a first dichroic element adapted to be mounted on the vehicle adjacent to the visible light source, said first dichroic element reflecting at least some of the visible light generated by the light source;
   the light reflected by the first element adapted to provide a first warning light signal within a first wavelength range when viewed by an observer remote from the vehicle;
   a second dichroic element adapted to be mounted on the vehicle adjacent to the visible light source, said second dichroic element reflecting at least some of the visible light generated by the light source; and
   the light reflected by the second element adapted to provide a second warning light signal within a second wavelength range when viewed by an observer remote from the vehicle.

2. The light of claim 1 wherein the dichroic element comprises a reflective filter.

3. The light of claim 1 further comprising a beam forming reflector having a focal point coincident with the visible light source such that the reflector reflects a beam of light, said first and second dichroic elements each positioned to intersect at least a portion of the beam of light.

4. The light of claim 3 further comprising first and second mirrors positioned to reflect the first and second warning light signals, respectively.

5. The light of claim 4 wherein the beam of light is projected in a direction which is substantially vertically upward and wherein the first and second mirrors are positioned to reflect the first and second warning light signals in a direction which is substantially horizontal and away from each other.

6. The light of claim 5 wherein the beam forming reflector comprises a beam forming trough, wherein the light source comprises a linear source and wherein the light bar is located on a light bar mounted on the vehicle.

7. The light of claim 1 further comprising a beam forming reflector having a focal point coincident with the visible light source such that the reflector reflects a beam of light which is at least partially intersected by the first element, and further comprising a sleeve at least partially surrounding the light source, said sleeve having a first portion reflecting light toward the beam forming reflector.

8. The light of claim 7 further comprising a second beam forming reflector having a focal point coincident with the visible light source such that the second reflector reflects a beam of light which is at least partially intersected by the second element, and wherein said sleeve has a second portion reflecting light toward the second beam forming reflector.

9. The light of claim 1 further comprising a beam forming reflector having a focal point coincident with the visible light source such that the reflector reflects a beam of light which is at least partially intersected by the first element, and further comprising a coating on the light source, said coating having a first portion reflecting light toward the beam forming reflector.

10. The light of claim 9 further comprising a second beam forming reflector having a focal point coincident with the visible light source such that the second reflector reflects a beam of light which is at least partially intersected by the second element, and wherein said coating has a second portion reflecting light toward the second beam forming reflector.

11. The light of claim 1 wherein the first dichroic element is a first coating on the light source and wherein the second dichroic element is a second coating on the light source.

12. The light of claim 1 wherein the first dichroic element and the second dichroic element form a sleeve at least partially surrounding the light source.

13. A light for a vehicle comprising:
- a visible light source adapted to be mounted on the vehicle for generating visible light creating warning signals which are viewed by observers remote from the vehicle; and
- a first dichroic element adapted to be mounted on the vehicle and adjacent to the visible light source to transmit at least some of the visible light generated by the light source and to reflect at least some of the visible light generated by the light source, wherein the reflected light provides a first warning light signal within a first wavelength range when viewed by an observer remote from the vehicle; and
- a second dichroic element adapted to be mounted on the vehicle and adjacent to the visible light source to transmit at least some of the visible light transmitted by the first dichroic element to provide a second warning signal within a second wavelength range different than the first wavelength range when viewed by an observer remote from the vehicle, wherein said second dichroic element reflects at least some of the visible light transmitted by the first dichroic element to provide a third warning signal within a third wavelength range different than the first and second wavelength ranges when viewed by an observer remote from the vehicle.

14. The light of claim 13 wherein the first dichroic element comprises a first reflective filter and wherein the second dichroic element comprises a second reflective filter.

15. A light for a vehicle comprising:
- a visible light source adapted to be mounted on the vehicle for generating visible light creating warning signals which are viewed by observers remote from the vehicle; and
- a first dichroic element adapted to be mounted on the vehicle and adjacent to the visible light source to transmit at least some of the visible light generated by the light source and to reflect at least some of the visible light generated by the light source, wherein the reflected light provides a first warning light signal within a first wavelength range when viewed by an observer remote from the vehicle; and
- a second dichroic element adapted to be mounted on the vehicle and adjacent to the visible light source to transmit at least some of the visible light reflected by the first dichroic element to provide a second warning signal within a second wavelength range different than the first wavelength range when viewed by an observer remote from the vehicle, wherein said second dichroic element reflects at least some of the visible light reflected by the first dichroic element to provide a third warning signal within a third wavelength range different than the first and second wavelength ranges when viewed by an observer remote from the vehicle.

16. The light of claim 15 wherein the first dichroic element comprises a first reflective filter and wherein the second dichroic element comprises a second reflective filter.

17. A method of making a warning light having a substrate with a dichroic coating thereon and having a light source, said warning light for generating a visual warning signal including light having a particular wavelength range, said method comprising the steps of:
- selecting a light source which emits light within the particular wavelength range;
- selecting a dichroic coating which transmits or reflects light within the particular wavelength range;
- positioning the substrate to intersect light emitted by the light source such that the intersected light is transmitted or reflected by the dichroic coating; and
- forming the warning signal from the intersected light.

18. The method of claim 17 wherein the dichroic coating comprises a reflective, filtering coating.

19. A method of making a warning light having a substrate with a dichroic coating thereon and having a light source, said warning light for generating a visual warning signal including light having a particular wavelength range, said method comprising the steps of:
- selecting a dichroic coating which reflects light within the particular wavelength range;
- positioning the substrate to intersect light emitted by the light source such that the intersected light is reflected by the dichroic coating; and
- forming the warning signal from the reflected light.

20. The method of claim 19 wherein the dichroic coating comprises a reflective, filtering coating.

* * * * *